United States Patent
Kamon et al.

(10) Patent No.: US 11,358,286 B2
(45) Date of Patent: Jun. 14, 2022

(54) ROBOT SYSTEM AND METHOD OF OPERATING THE SAME

(71) Applicant: KAWASAKI JUKOGYO KABUSHIKI KAISHA, Kobe (JP)

(72) Inventors: Masayuki Kamon, Akashi (JP); Hideyuki Ryu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 266 days.

(21) Appl. No.: 16/604,719

(22) PCT Filed: Apr. 10, 2018

(86) PCT No.: PCT/JP2018/015132
§ 371 (c)(1),
(2) Date: Oct. 11, 2019

(87) PCT Pub. No.: WO2018/190345
PCT Pub. Date: Oct. 18, 2018

(65) Prior Publication Data
US 2020/0055194 A1     Feb. 20, 2020

(30) Foreign Application Priority Data

Apr. 11, 2017    (JP) .............................. JP2017-078190

(51) Int. Cl.
    *B25J 13/06*      (2006.01)
    *B25J 19/04*      (2006.01)
    *G05B 19/418*     (2006.01)

(52) U.S. Cl.
    CPC ............... *B25J 13/06* (2013.01); *B25J 19/04* (2013.01); *G05B 19/41865* (2013.01); *G05B 2219/32128* (2013.01); *G05B 2219/39001* (2013.01)

(58) Field of Classification Search
    CPC . B25J 19/02; B25J 19/04; B25J 19/023; B25J 13/00; B25J 13/06;
    (Continued)

(56) References Cited

U.S. PATENT DOCUMENTS

2004/0189675 A1    9/2004  Pretlove et al.
2008/0266254 A1*  10/2008  Robbins ............... G05D 1/0044
                                                          345/161

(Continued)

FOREIGN PATENT DOCUMENTS

EP          1 435 737 A1     7/2004
JP          2013-091114 A    5/2013
KR          101776576 B1 *   9/2017    .............. B25J 13/08

OTHER PUBLICATIONS

Keerio et al., Virtual Reality Based Teleoperation Control of Humanoid Robot BHR-2, 2007, IEEE, pg. p. 1160-1165 (Year: 2007).*

(Continued)

*Primary Examiner* — McDieunel Marc
(74) *Attorney, Agent, or Firm* — Oliff PLC

(57) ABSTRACT

A robot system includes a user interface configured to receive an operational instruction from an operator, a robot installed in a workspace and configured to perform a series of works including a plurality of processes, a sensor installed in the workspace, a transparent type display unit configured so that the operator is visible of a physical real world and configured to display information detected by the sensor as the image screen, and a control device. The control device displays on the transparent type display unit, when the robot is operated by the user interface, first information that is information detected by the sensor, as the image screen.

21 Claims, 24 Drawing Sheets

(58) Field of Classification Search
CPC .... G02B 2027/0178; G02B 2027/0138; G02B 2219/39001; G02B 2219/32128; G05B 19/41865
See application file for complete search history.

(56) References Cited

U.S. PATENT DOCUMENTS

| | | | |
|---|---|---|---|
| 2013/0073092 A1* | 3/2013 | Hosek | B25J 13/00 700/264 |
| 2016/0158937 A1 | 6/2016 | Kamoi et al. | |
| 2017/0203438 A1* | 7/2017 | Guerin | B25J 9/1605 |
| 2017/0372139 A1* | 12/2017 | Thomasson | G02B 27/017 |
| 2018/0267314 A1* | 9/2018 | Shibasaki | G02B 27/017 |
| 2019/0008595 A1* | 1/2019 | Popovic | A61B 34/20 |
| 2019/0283248 A1* | 9/2019 | Guerin | B25J 9/1671 |
| 2019/0371274 A1* | 12/2019 | Yamada | G09G 5/32 |

OTHER PUBLICATIONS

Zhang et al., A Simulation and Monitoring System for the Humanoid Robot BHR-02 Teleoperation, 2006, IEEE, p. 695-700 (Year: 2006).*

Chen et al., A networked teleoperation system for a mobile robot with multiple viewpoints virtual scene, 2008, IEEE, p. 2380-2385 (Year: 2008).*

Zhang et al., A Visual Tele-operation System for the Humanoid Robot BHR-02, 2006, IEEE, pg. (Year: 2006).*

Young et al., Robot Task Execution with Telepresence Using Virtual Reality Technology, 1998, Internet, p. 1-8 (Year: 1998).*

Hasunuma et al., Development of Teleoperation Master System with a Kinesthetic Sensation of Presence, 1999, Internet, p. 1-7 (Year: 1999).*

* cited by examiner

ROBOT SYSTEM AND METHOD OF OPERATING THE SAME

TECHNICAL FIELD

The present disclosure relates to a robot system and a method of operating the same.

BACKGROUND ART

An interactive operating system in which an operator teaches a robot an operation using a robot teaching device which is operated by the operator is known. The sensed information (image information) by a sensed information detector disposed at the robot and actually sensed information (peripheral information) sensed by the operator himself are constantly and duplicatedly sensed and, thus, the robot can be operated while constantly paying attention to the environment around the operator.

DESCRIPTION OF THE DISCLOSURE

Problem to be Solved by the Disclosure

However, although in the interactive operating system the image information imaged by a camera disposed at the robot, and the actual peripheral information around the operator are always duplicatedly projected on a head mounted display, either the image information or the peripheral information may not be needed depending on a work process of the robot. Even in such a case, since the image information or the peripheral information is displayed, it is annoying for the operator and the burden to the operator is large, and therefore, there is still room for an improvement in terms of an improvement of work efficiency.

SUMMARY OF THE DISCLOSURE

In order to solve the above problem, a robot system according to one aspect of the present disclosure includes a user interface configured to receive an operational instruction from an operator, a robot installed in a workspace and configured to perform a series of works comprised of a plurality of processes, a sensor installed in the workspace, a transparent type display unit configured so that the operator is visible of a physical real world and configured to display an image screen, and a control device. The control device displays on the transparent type display unit, when the robot is operated by the user interface, first information that is information detected by the sensor, as the image screen.

Therefore, when the first information that is information detected by the sensor is required, it can be displayed on the transparent type display unit. Thus, the operator's burden can be reduced and the work efficiency can be improved.

Moreover, a method of operating a robot system according to one aspect of the present disclosure is provided. The robot system includes a user interface configured to receive an operational instruction from an operator, a robot installed in a workspace and configured to perform a series of works comprised of a plurality of processes, a sensor installed in the workspace, and a transparent type display unit configured so that the operator is visible of a physical real world and configured to display an image screen. The method includes (A) displaying on the transparent type display unit, when the robot is operated by the user interface, first information that is information detected by the sensor, as the image screen.

Therefore, when the first information that is information detected by the sensor is required, it can be displayed on the transparent type display unit. Thus, the operator's burden can be reduced and the work efficiency can be improved.

Effect of the Disclosure

According to the robot system and the method of operating the same of the present disclosure, the operator's burden can be reduced and the work efficiency can be improved.

MODES FOR CARRYING OUT THE DISCLOSURE

Figure 1:
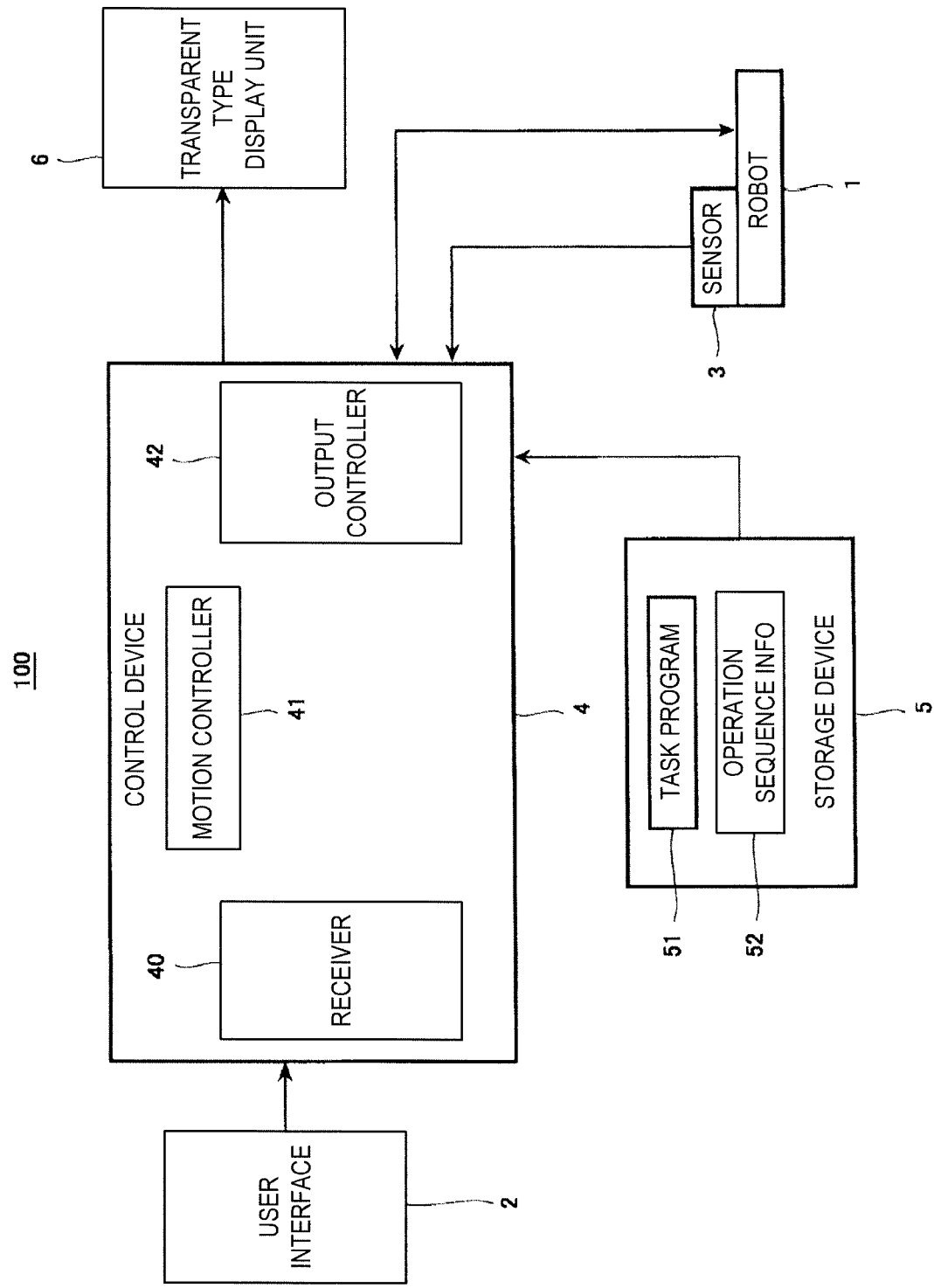
FIG. 1 is a block diagram illustrating an outline configuration of a robot system according to Embodiment 1.

Hereinafter, embodiments of the present disclosure will be described with reference to the drawings. Note that, throughout the drawings, the same reference characters are given to the same or corresponding parts to omit redundant description. Moreover, throughout the drawings, components illustrating the present disclosure are selectively illustrated, and illustration of other components may be omitted. Further, the present disclosure is not limited to the following embodiments.

Embodiment 1

A robot system according to Embodiment 1 includes a user interface which receives an operational instruction from an operator, a robot which is installed in a workspace and performs a series of works comprised of a plurality of processes, a sensor installed in the workspace, a transparent type display unit which is configured so that an operator is visible of a physical real world and is configured to display an image screen, and a control device. The control device displays, as the image screen, first information which is information detected by the sensor on the transparent type display unit, when the robot is operated by the user interface.

Moreover, in the robot system according to Embodiment 1, the sensor may be disposed at a tip-end part of the robot.

Alternatively, in the robot system according to Embodiment 1, the sensor may be comprised of a camera.

Further, in the robot system according to Embodiment 1, the transparent type display unit may be configured to be wearable by the operator.

Below, one example of the robot system according to Embodiment 1 is described with reference to FIGS. 1 to 6.

[Configuration of Robot System]

Figure 2:
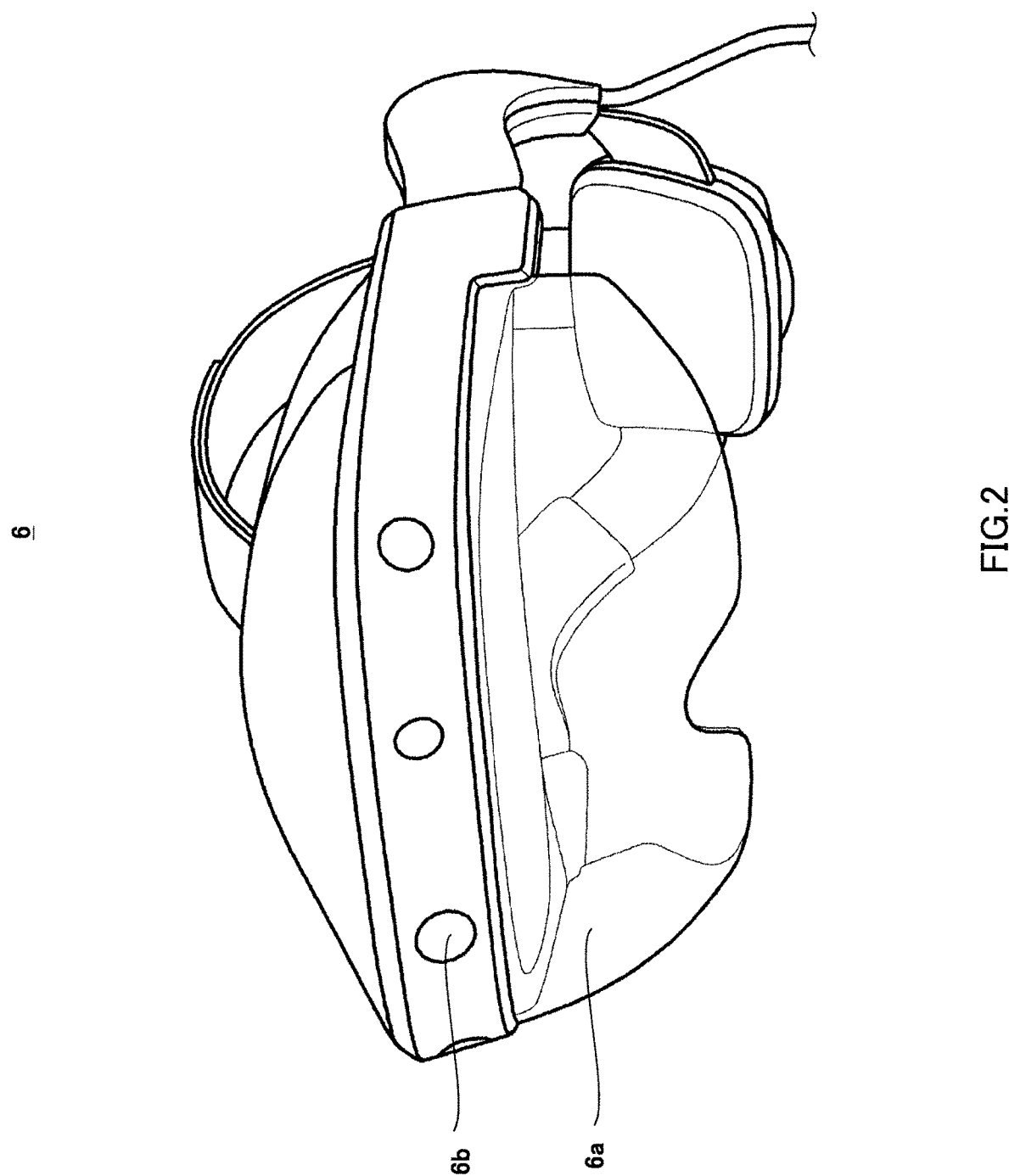
FIG. 2 is a schematic view illustrating one example of a transparent type display unit of the robot system illustrated in FIG. 1.

FIG. 1 is a block diagram illustrating an outline configuration of the robot system according to Embodiment 1. FIG. 2 is a schematic view illustrating one example of the transparent type display unit of the robot system illustrated in FIG. 1.

As illustrated in FIG. 1, the robot system 100 according to Embodiment 1 includes a robot 1, a user interface 2, a sensor 3, a control device 4, a storage device 5, and a transparent type display unit 6. The robot system 100 is configured so that the robot 1 operates by the operator operating the user interface 2. Moreover, the robot system 100 according to Embodiment 1 is configured so that, when the operator operates the user interface 2, the control device 4 displays first information which is information detected by the sensor 3 on the transparent type display unit 6 as an image screen. Below, each apparatus provided to the robot system 100 according to Embodiment 1 is described.

The robot 1 is installed in a workspace, and is configured to perform a series of works comprised of a plurality of processes. Note that the series of works comprised of a plurality of processes include works, such as assembling of a component to a product, painting, etc.

The robot 1 according to Embodiment 1 is an articulated robot used at a production plant which assembles electric and/or electronic components etc. to manufacture the product in a line production system or a cell production system, is disposed along a workbench provided in this production plant, and is capable of performing at least one of works, such as transferring, assembling or relocating of a component, and a posture conversion, for the workpiece on the workbench. However, the embodiment of the robot 1 is not limited to the above applications, and is widely applicable to articulated robots, regardless of the horizontal articulated type and the vertical articulated type.

Here, a concrete configuration of the robot 1 is described with reference to FIG. 3.

Figure 3:
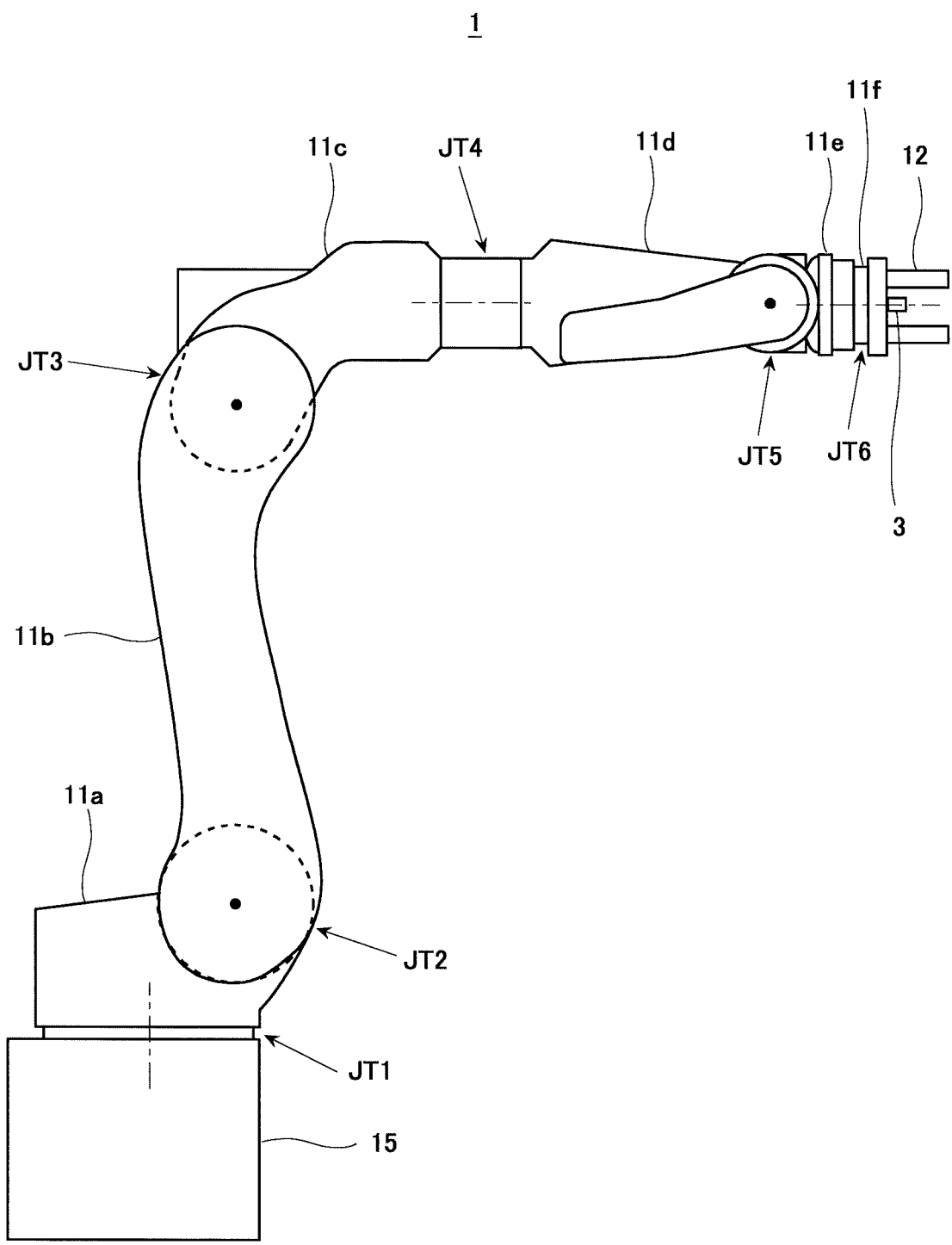
FIG. 3 is a schematic view illustrating an outline configuration of a robot in the robot system illustrated in FIG. 1.

FIG. 3 is a schematic view illustrating an outline configuration of the robot in the robot system illustrated in FIG. 1.

As illustrated in FIG. 3, the robot 1 is an articulated robotic arm having a serially coupling body of a plurality of links (here, a first link 11a to a sixth link 11f), a plurality of joints (here, a first joint JT1 to a sixth joint JT6), and a pedestal 15 which supports the links and joints.

In the first joint JT1, the pedestal 15 and a base-end part of the first link 11a are coupled to each other so as to be rotatable on an axis extending in the up-and-down direction. In the second joint JT2, a tip-end part of the first link 11a and a base-end part of the second link 11b are coupled to each other so as to be rotatable on an axis extending in the horizontal direction. In the third joint JT3, a tip-end part of the second link 11b and a base-end part of the third link 11c are coupled to each other so as to be rotatable on an axis extending in the horizontal direction.

Moreover, in the fourth joint JT4, a tip-end part of the third link 11c and a base-end part of the fourth link 11d are coupled to each other so as to be rotatable on an axis extending in the longitudinal direction of the fourth link 11d. In the fifth joint JT5, a tip-end part of the fourth link 11d and a base-end part of the fifth link 11e are coupled to each other so as to be rotatable on an axis perpendicular to the longitudinal direction of the fourth link 11d. In the sixth joint JT6, a tip-end part of the fifth link 11e and a base-end part of the sixth link 11f are coupled to each other so as to be rotatable in a twisting manner.

A mechanical interface is provided to a tip-end part of the sixth link 11f. An end effector 12 corresponding to the type of the work is detachably attached to the mechanical interface. Moreover, a camera 3A which constitutes the sensor 3 is provided to the mechanical interface (a tip-end part of the robot 1). The camera 3A is configured to output captured image information to the control device 4.

Moreover, a drive motor (not illustrated) as one example of an actuator which relatively rotates two members coupled by each joint is provided to each of the first joint JT1 to the sixth joint JT6. The drive motor may be, for example, a servo motor which is servo-controlled by the control device 4. Moreover, a rotation sensor which detects a rotational position of the drive motor, and a current sensor which detects current for controlling the rotation of the drive motor are provided to each of the first joint JT1 to the sixth joint JT6 (none of them is illustrated). The rotation sensor may be, for example, an encoder.

The user interface 2 is a device which is installed outside the workspace and receives an operational instruction from the operator. The user interface 2 may include, for example, a master arm, a joystick, or a tablet. Moreover, the user interface 2 may be provided with a regulator for adjusting an operating speed of the robot 1.

The storage device (memory) 5 is a readable and writable recording medium, and stores a task program 51 and operation sequence information 52 of the robot system 100. Note that, in the robot system 100 according to Embodiment 1, although the storage device 5 is provided separately from the control device 4, it may be provided integrally with the control device 4.

The task program 51 is created, for example, by the operator performing teaching by using the user interface 2 comprised of a teaching pendant etc., and it is stored in the storage device 5 so as to be associated with identification information and a task of the robot 1. Note that the task program 51 may be created as an operation flow for each work.

The operation sequence information 52 is information related to the operation sequence which defines a series of operation processes to be carried out by the robot 1 in the workspace. In the operation sequence information 52, an operating order of the work processes, and a control mode of the robot 1 are associated with each other. Moreover, in the operation sequence information 52, the task program for causing the robot 1 to automatically perform a work is associated with each work process. Note that the operation sequence information 52 may include a program for causing the robot 1 to automatically perform the work of each work process.

The control device 4 controls operation of the robot 1, and includes a receiver 40, a motion controller 41, and an output controller 42, as functional blocks. The control device 4 can be comprised of, for example, a processor (not illustrated) comprised of a microcontroller, a MPU, a PLC (Programmable Logic Controller), or a logic circuit, and a memory (not illustrated) comprised of a ROM or a RAM. Moreover, each functional block provided to the control device 4 can be implemented by the processor of the control device 4 reading and executing the program stored in the memory or the storage device 5.

Note that the control device 4 may be comprised of a sole control device, or may be comprised of a group of control devices which execute the control of the robot 1 (robot system 100) by a collaboration of the plurality of control devices.

The receiver 40 receives an input signal transmitted from the outside of the control device 4. The input signal received by the receiver 40 may include, for example, a signal transmitted from the user interface 2, and a signal transmitted from an operational instruction part (not illustrated) other than the user interface 2.

When the receiver 40 receives the operational instruction from the user interface 2 as the input signal, the motion controller 41 controls the robot 1 to operate based on the operational instruction received by the receiver 40 from the user interface 2.

Moreover, when the receiver 40 receives the operational instruction (operational signal) from the user interface 2 as the input signal, the motion controller 41 outputs the first information detected by the sensor 3 to the transparent type display unit 6 through the output controller 42, as the image screen. In detail, in Embodiment 1, the motion controller 41 outputs the image information (first information) inputted into the receiver 40 from the camera 3A to the transparent type display unit 6 through the output controller 42, as the image screen.

Note that, when the operational instruction signal to operate the robot 1 at a given first speed or below is inputted into the receiver 40 from the user interface 2, the motion controller 41 may output the image information inputted into the receiver 40 from the camera 3A, to the transparent type display unit 6 through the output controller 42, as the image screen.

Here, the first speed can be set beforehand, for example, by an experiment. For example, the first speed may be 25 to 35% of the top speed (degree/second) of each joint of the robot 1, or may be 25 to 35% of the top speed (mm/second) of a moving speed of the robot 1 (a moving speed of the end effector 12 or a workpiece) when the robot 1 moves the workpiece. Moreover, when the robot 1 moves the workpiece on a straight line or a curve, as the first speed, the moving speed of the robot 1 (the moving speed of the end effector 12 or the workpiece) may be, for example, 250 to 350 mm/second.

The transparent type display unit 6 is configured so that the operator can view the physical real world, and is configured to display the image captured by the camera 3A (image information). In detail, as illustrated in FIG. 2, the transparent type display unit 6 may be comprised of a head mounted display or glasses which the operator wears for use, and which is provided with a display part 6a for projecting the image information outputted from the output controller 42 of the control device 4. Moreover, the transparent type display unit 6 may be comprised of a non-portable transparent display unit which is used while being placed on a desk, a floor, etc.

Note that, as illustrated in FIG. 2, the transparent type display unit 6 may be provided with a camera 6b which acquires information about the real world which is viewed by the operator.

[Operation and Effects of Robot System]

Next, operation and effects of the robot system 100 according to Embodiment 1 are described with reference to FIGS. 1 to 6. Note that the following operation is executed by the processor of the control device 4 reading the program stored in the memory or the storage device 5.

Figure 4:
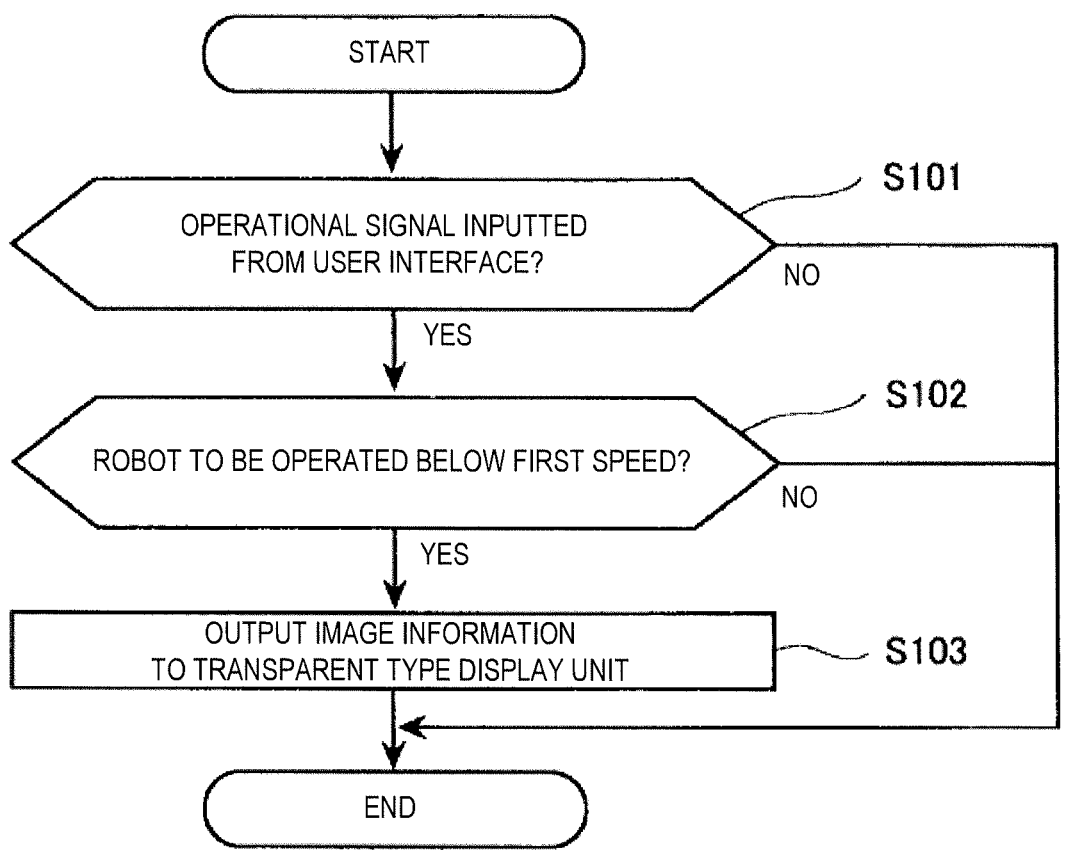
FIG. 4 is a flowchart illustrating one example of operation of the robot system according to Embodiment 1.

FIG. 4 is a flowchart illustrating one example of operation of the robot system according to Embodiment 1.

As illustrated in FIG. 4, the control device 4 determines whether the operational signal for operating the robot 1 is inputted from the user interface 2 (Step S101). In detail, the motion controller 41 of the control device 4 determines whether the operational signal is inputted into the receiver 40 from the user interface 2.

If the control device 4 determines that the operational signal is not inputted from the user interface 2 (No at Step S101), it ends this program. Note that when the control device 4 ends this program, it then executes this program again, for example after 50 msec.

On the other hand, if the control device 4 determines that the operational signal is inputted from the user interface 2 (Yes at Step S101), it performs processing at Step S102.

At Step S102, the control device 4 determines whether the robot 1 is to be operated at the first speed or below. In detail, the motion controller 41 of the control device 4 determines whether the operational signal for operating the robot 1 at the first speed or below is inputted from the user interface 2.

If the control device 4 determines that the robot 1 is to be operated at a higher speed than the first speed (No at Step S102), it ends this program. Note that when the control device 4 ends this program, it executes this program again, for example, after 50 msec.

On the other hand, if the control device 4 determines that the robot 1 is to be operated at the first speed or below (Yes at Step S102), it causes the transparent type display unit 6 to output the image information inputted from the camera 3A (Step S103), and ends this program. Note that when the control device 4 ends this program, it executes this program again, for example, after 50 msec.

Next, a concrete example of operation of the robot system 100 according to Embodiment 1 is described with reference to FIGS. 1 to 6.

Figure 5:
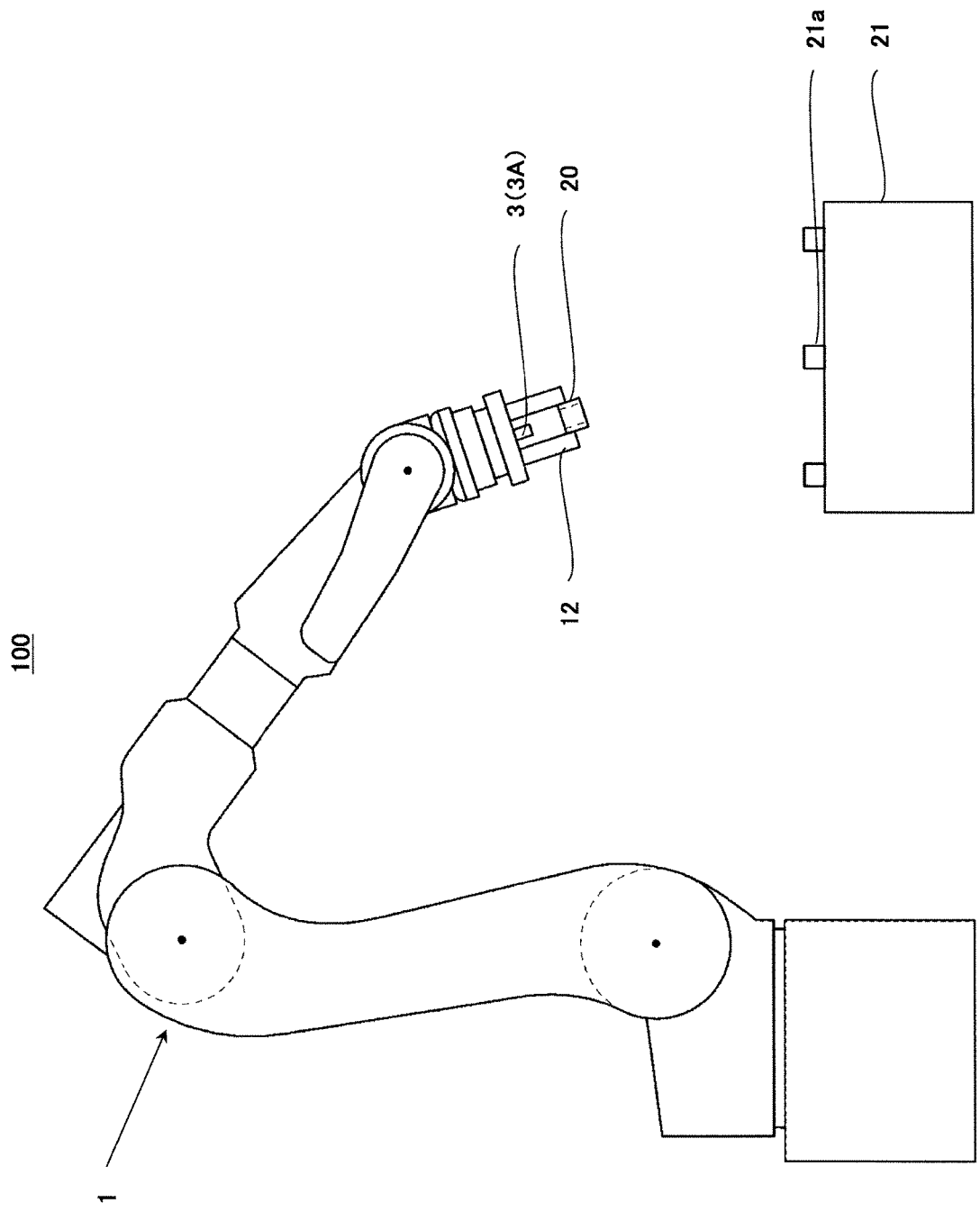
FIG. 5 is a schematic view illustrating a field of view of an operator viewing through the transparent type display unit illustrated in FIG. 2.
Figure 6:
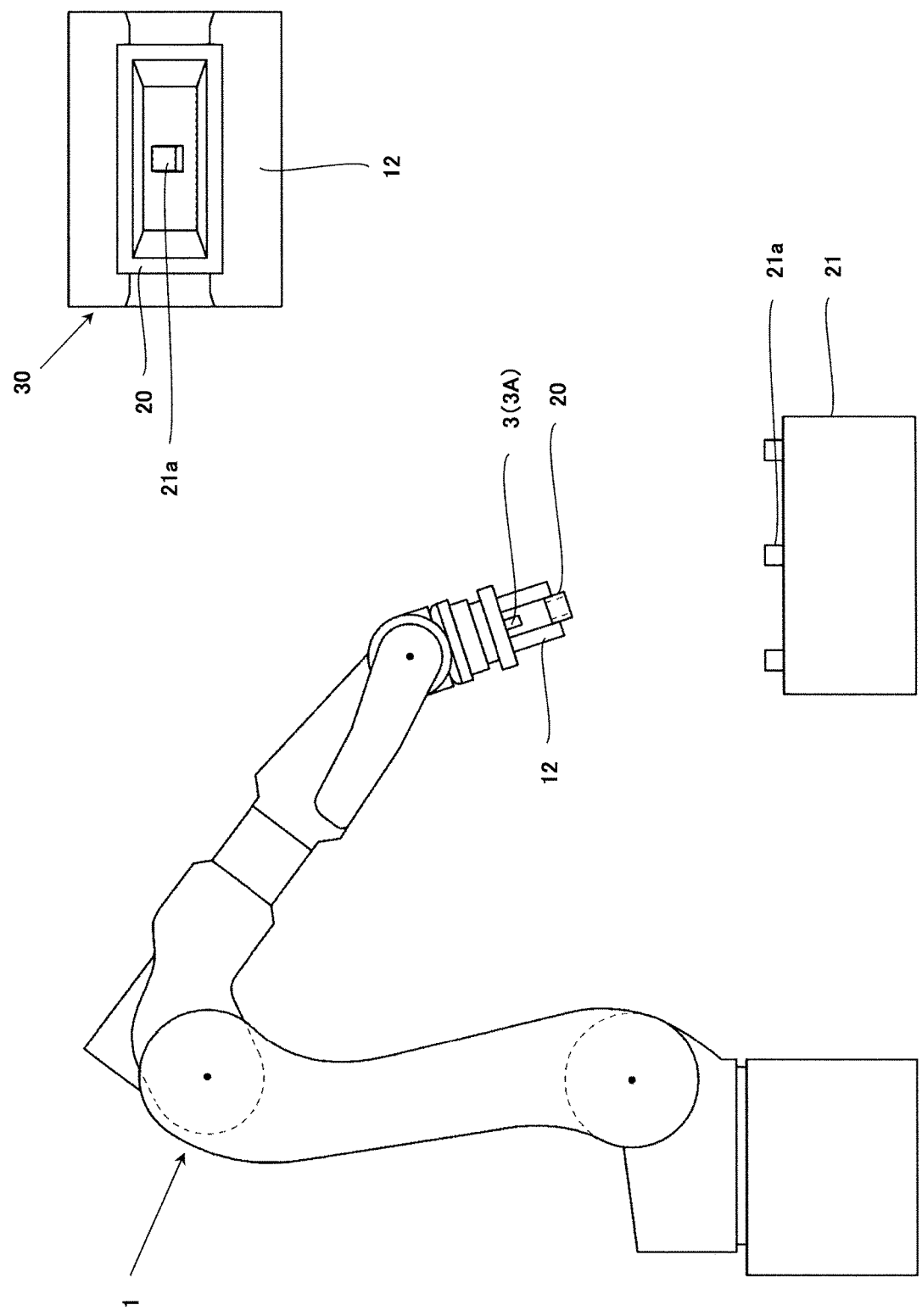
FIG. 6 is a schematic view illustrating a field of view of the operator viewing through the transparent type display unit illustrated in FIG. 2.

FIGS. 5 and 6 are schematic views illustrating a field of view of the operator viewing through the transparent type display unit illustrated in FIG. 2. Note that, as illustrated in FIGS. 5 and 6, below, as one concrete example of operation of the robot system 100 according to Embodiment 1, operation for fitting a cylindrical workpiece 20 held by the robot 1 onto a protrusion 21a provided to a pedestal 21 is described.

First, the operator operates the user interface 2 to make the end effector 12 of the robot 1 hold the workpiece 20. At this time, as illustrated in FIG. 6, the control device 4 may control the transparent type display unit 6 to display the image information imaged by the camera 3A on the display part 6a of the transparent type display unit 6, as the image screen 30.

Next, the operator operates the user interface 2 to operate the robot 1 so that the workpiece 20 held by the end effector 12 approaches the protrusion 21a of the pedestal 21. At this time, the control device 4 may control the transparent type display unit 6 to display the image information imaged by the camera 3A on the display part 6a of the transparent type display unit 6, as the image screen 30. Moreover, as illustrated in FIG. 5, when the operator operates the robot 1 so that the robot 1 operates above the first speed, the control device 4 may control the transparent type display unit 6 not to display the image information imaged by the camera 3A on the display part 6a of the transparent type display unit 6.

Next, the operator operates the user interface 2 to operate the robot 1 so that the workpiece 20 held by the end effector 12 fits onto the protrusion 21a. At this time, as illustrated in FIG. 6, the control device 4 may control the transparent type display unit 6 to display the image information imaged by the camera 3A on the display part 6a of the transparent type display unit 6, as the image screen 30.

Therefore, the operator can easily grasp a spatial relationship between the workpiece 20 and the protrusion 21a, and can easily operate the robot 1. Thus, the operator's work burden can be reduced and the operator's work efficiency can be improved.

Note that the control device 4 may control the transparent type display unit 6 so as to acquire field-of-view information which is actually viewed by the operator from a camera provided to the transparent type display unit 6, analyze the field-of-view information, and display the image screen 30 on the field of view where the robot 1 and the pedestal 21 are not projected.

In the robot system 100 according to Embodiment 1 thus configured, when the operator operates the user interface 2 to operate the robot 1, the control device 4 sets the first information detected by the sensor 3 as the image screen 30, and displays the captured image on the transparent type display unit 6. Therefore, when the first information detected by the sensor 3 is required, it can be displayed on the transparent type display unit 6. Thus, the operator's burden can be reduced and the work efficiency can be improved.

Meanwhile, when carrying out operation which requires positioning of the tip-end part of the robot 1 (end effector 12), such as operation for holding workpiece 20 by the robot 1, and operation for fitting the workpiece 20 onto the protrusion 21a, the operator operates the robot 1 at the first speed or below, in order to carefully operate the robot 1. Moreover, when carrying out operation which requires the positioning of the tip-end part of the robot 1 (end effector 12), the positioning is easy if there is image information near the tip-end part of the robot 1.

Thus, in the robot system 100 according to Embodiment 1, the control device 4 displays the image information imaged by the camera 3A on the transparent type display unit 6, as the image screen 30, in response to the input of the operational instruction signal for operating the robot 1 at the first speed or below from the user interface 2.

Therefore, when the image information imaged by the camera 3A is required, it can be displayed on the transparent type display unit 6. Thus, the operator's burden can be reduced and the work efficiency can be improved.

[Modification 1]

Next, a modification of the robot system according to Embodiment 1 is described with reference to FIG. 7.

Figure 7:
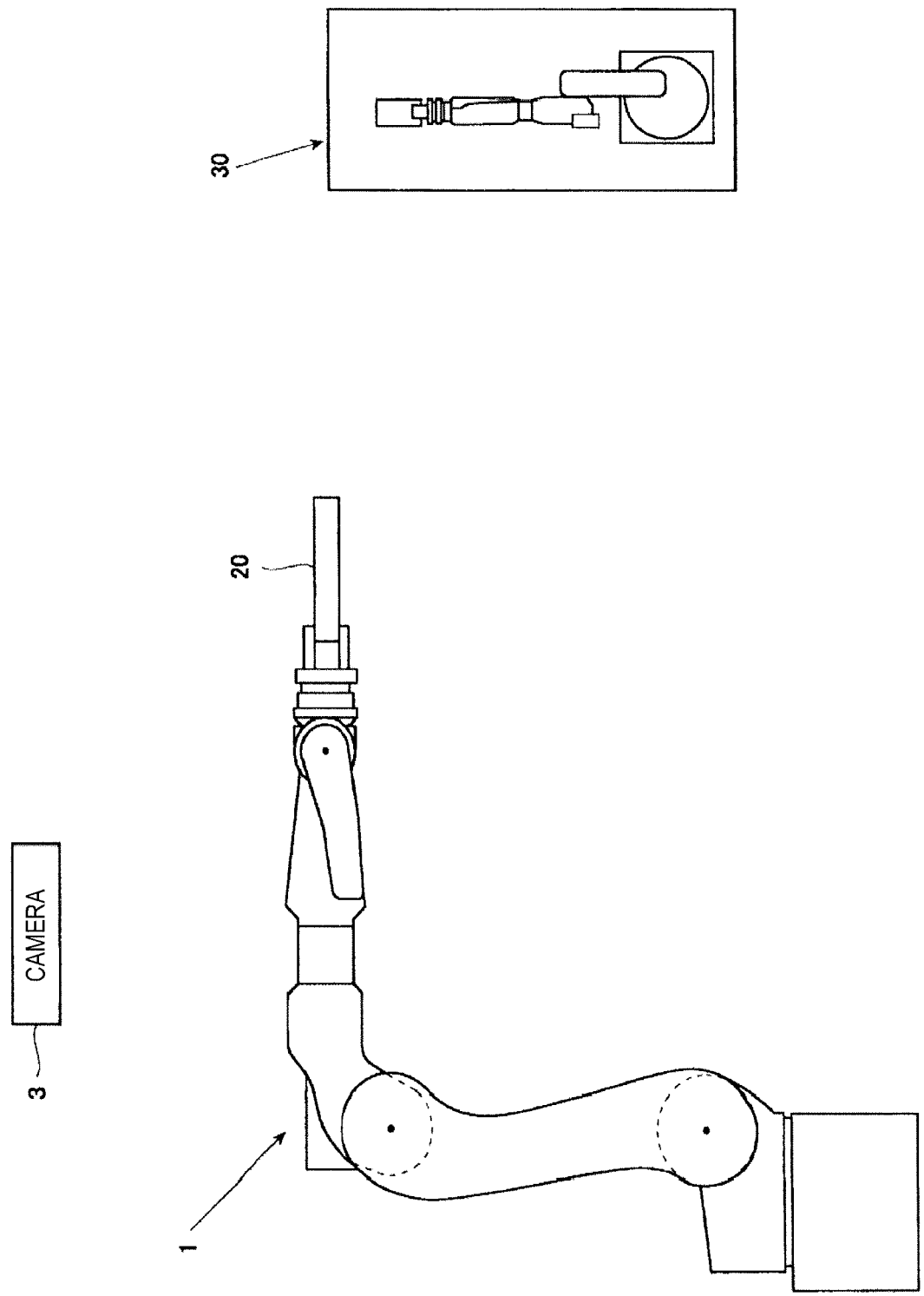
FIG. 7 is a schematic view illustrating a field of view of the operator viewing through a transparent type display unit in a robot system of Modification 1 of Embodiment 1.

FIG. 7 is a schematic view illustrating a field of view of the operator viewing through the transparent type display unit in a robot system of Modification 1 of Embodiment 1.

As illustrated in FIG. 7, although the robot system 100 according to Modification 1 is the same in the fundamental configuration as the robot system 100 of Embodiment 1, the sensor 3 is comprised of a camera 3A, and the camera 3A is configured to image the robot 1 from above.

In addition, as illustrated in FIG. 7, in the robot system 100 of Modification 1, when the user interface 2 is operated to operate the robot 1, the control device 4 displays the image information imaged by the camera 3A on the transparent type display unit 6, as the image screen 30.

Even in the robot system 100 of Modification 1 thus configured, similar operation and effects to the robot system 100 according to Embodiment 1 can be obtained.

Embodiment 2

In the robot system according to Embodiment 1 (including Modification), a robot system according to Embodiment 2 is configured so that the sensor detects at least one information of an information group comprised of vibration information, audio information, pressure information, acceleration information, inclination information, positional information, and image information.

Moreover, the robot system according to Embodiment 2 is further provided with a memory which stores a given first threshold, and when the first information detected by the sensor is the first threshold or above, the control device may display on a transparent type display unit, abnormality information which is information indicating that an abnormality has occurred.

Below, one example of the robot system according to Embodiment 2 is described with reference to FIGS. 8 and 9.

[Configuration of Robot System]

Figure 8:
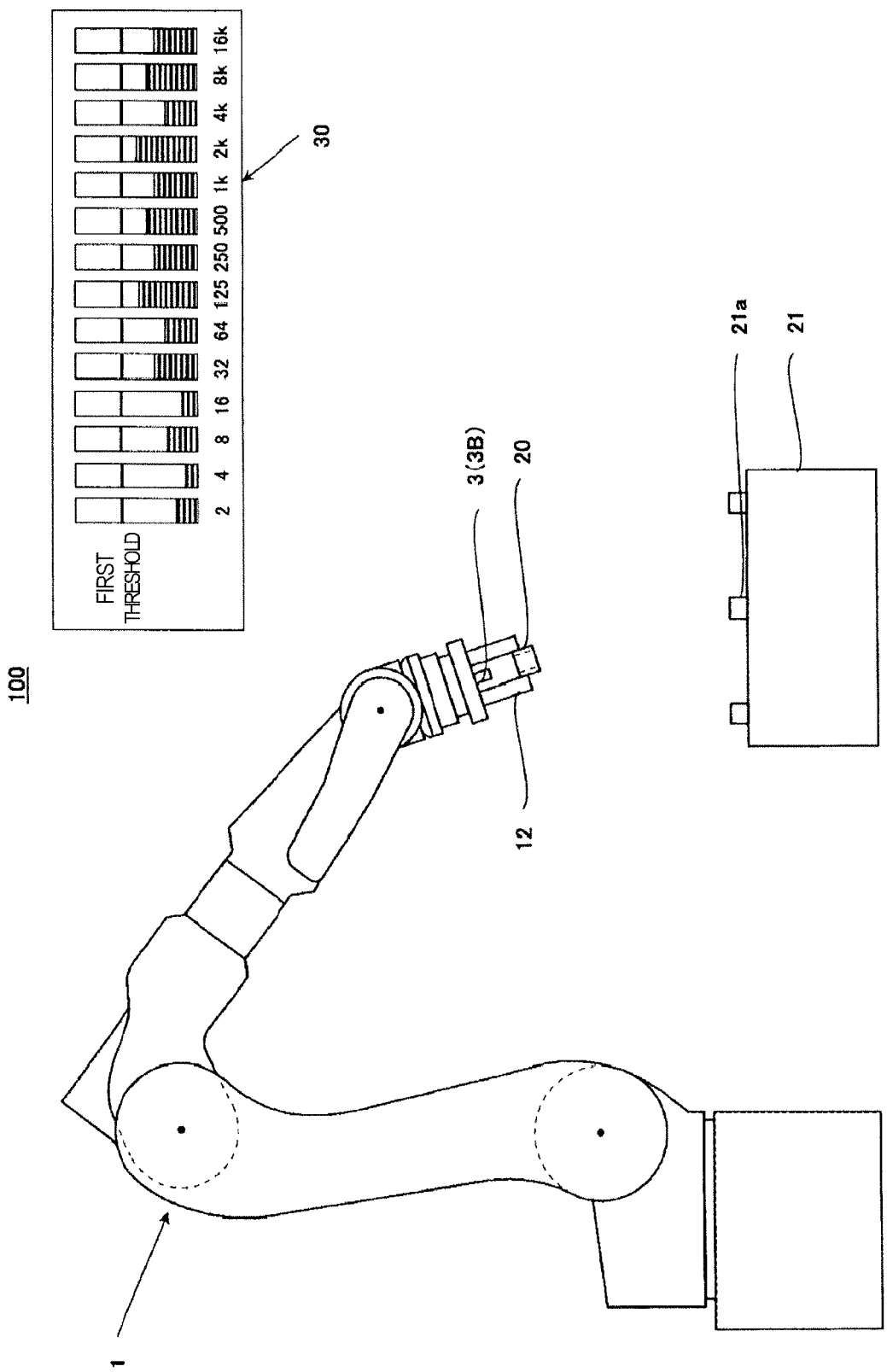
FIG. 8 is a schematic view illustrating a field of view of the operator viewing through a transparent type display unit in a robot system according to Embodiment 2.

FIG. 8 is a schematic view illustrating a field of view of the operator viewing through the transparent type display unit in the robot system according to Embodiment 2.

As illustrated in FIG. 8, the robot 1 of the robot system 100 according to Embodiment 2 includes a vibration sensor 3B as the sensor 3. The vibration sensor 3B outputs detected vibration as the vibration information (first information) to the control device 4, if it is configured to detect vibration in a frequency band (for example, several Hz to about 1 kHz) corresponding to a human tactile sense (hereinafter, referred to as "tactile sense vibration").

Moreover, the vibration sensor 3B outputs detected vibration as the audio information (first information) to the control device 4, if it is configured to detect vibration in a frequency band (for example, about 20 Hz to about 20 kHz) corresponding to human hearing (hereinafter, referred to as "hearing vibration").

Note that, in Embodiment 2, the vibration sensor 3B is configured to detect the vibration information and/or the audio information, and output the information to the control device 4.

In addition, the control device 4 displays the vibration information and/or the audio information acquired from the vibration sensor 3B on the transparent type display unit 6, as the image screen 30. In detail, as illustrated in FIG. 8, the control device 4 displays a screen indicative of respective volumes illustrated by bars corresponding to frequency bands (2 Hz, 4 Hz, 8 Hz, 16 Hz, 32 Hz, 64 Hz, 125 Hz, 250 Hz, 500 Hz, 1 kHz, 2 kHz, 4 kHz, 8 kHz, and 16 kHz) on the transparent type display unit 6, as the image screen 30. Note that, in Embodiment 2, 2 Hz, 4 Hz, 8 Hz, and 16 Hz are treated as the vibration information, and 32 Hz, 64 Hz, 125 Hz, 250 Hz, 500 Hz, 1 kHz, 2 kHz, 4 kHz, 8 kHz, and 16 kHz are treated as the audio information.

Moreover, the control device 4 may display the first threshold set beforehand as the image screen 30. In detail, as illustrated in FIG. 8, the first threshold is displayed as a thick line. Here, the first threshold can be set beforehand by an experiment etc., and is stored in the memory or the storage device 5 of the control device 4.

The first threshold may be set individually for each frequency band. Moreover, the first threshold may be change suitably according to the type of the work performed by the robot 1. For example, the first threshold may be a value obtained by adding 1 dB to 20 dB to the volume generated in the workspace where the robot 1 is disposed, or may be a value obtained by adding 1 dB to 5 dB to the volume, or may be a value obtained by adding 5 dB to 10 dB to the volume, or may be a value obtained by adding 10 dB to 20 dB to the volume.

[Operation and Effects of Robot System]

Next, operation and effects of the robot system 100 according to Embodiment 2 are described with reference to FIGS. 8 and 9. Note that since the operation for displaying the first information detected by the sensor 3 on the transparent type display unit 6, as the image screen, when the robot is operated by the user interface, is performed similarly to the robot system 100 according to Embodiment 1, the detailed description thereof is omitted. Moreover, the following operation is executed by the processor of the control device 4 reading the program stored in the memory or the storage device 5.

Figure 9:
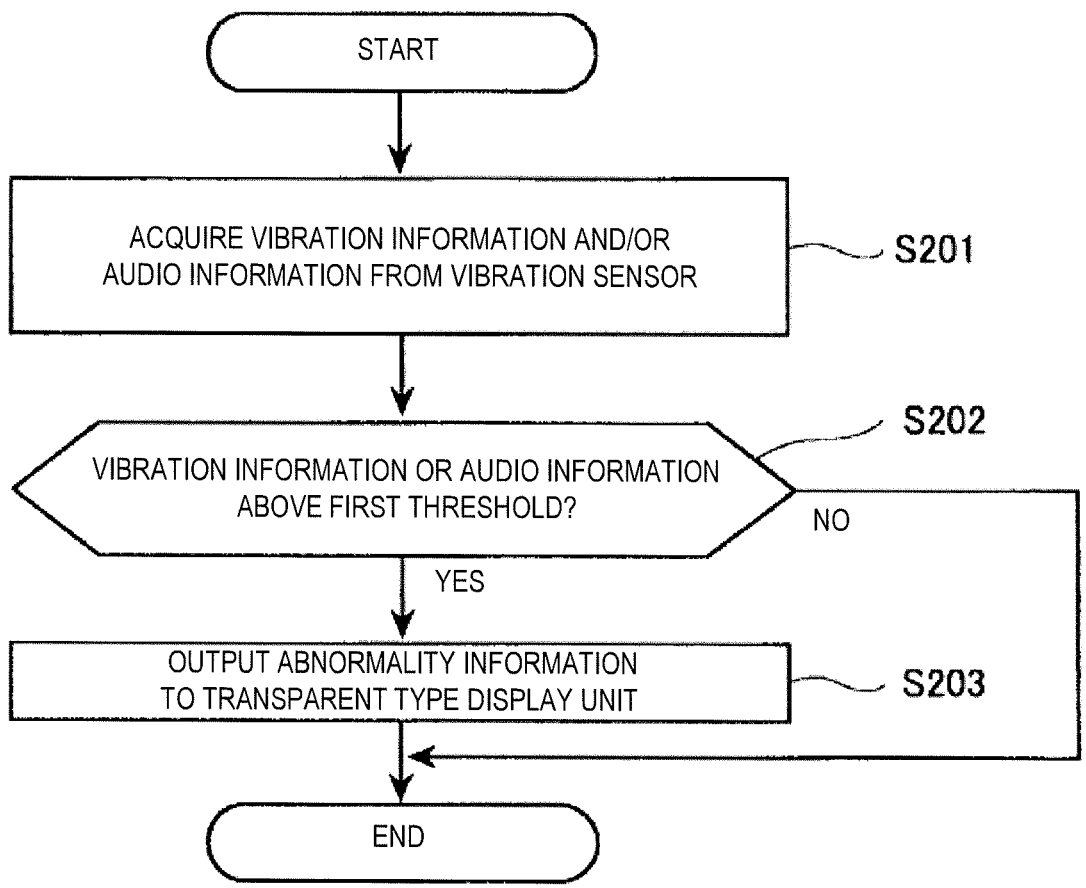
FIG. 9 is a flowchart illustrating one example of operation of the robot system according to Embodiment 2.

FIG. 9 is a flowchart illustrating one example of operation of the robot system according to Embodiment 2.

As illustrated in FIG. 9, the control device 4 acquires from the vibration sensor 3B the vibration information and/or the audio information detected by the vibration sensor 3B (Step S201). Next, the control device 4 determines whether the vibration information or the audio information acquired at Step S201 is the first threshold or above (Step S202).

If the control device 4 determines that the vibration information or the audio information acquired at Step S201 is below the first threshold (No at Step S202), it ends this program. Note that, when the control device 4 ends this program, it executes this program again, for example, after 50 msec.

On the other hand, if the control device 4 determines that the vibration information or the audio information acquired at Step S201 is the first threshold or above (Yes at Step S202), it displays the abnormality information which is information indicating that an abnormality has occurred on the transparent type display unit 6 (Step S203), and ends this program. Note that, when the control device 4 ends this program, it executes this program again, for example, after 50 msec.

As a method of displaying the abnormality information, for example, the control device 4 may display characters, such as an occurrence of the abnormality or an error, on the display part 6a of the transparent type display unit 6. Moreover, the control device 4 may display a picture, an image, or an animation or video etc. indicating that an abnormality has occurred, on the display part 6a of the transparent type display unit 6. Further, the control device 4 may display a given color (for example, red, blue, etc.) on the display part 6a of the transparent type display unit 6.

Even in the robot system 100 according to Embodiment 2 thus configured, similar operation and effects to the robot system 100 according to Embodiment 1 can be obtained.

Moreover, in the robot system 100 according to Embodiment 2, when the vibration information or the audio information detected by the vibration sensor 3B is the first threshold or above, the control device 4 displays the abnormality information about the transparent type display unit 6. Therefore, the operator can easily understand that an abnormality has occurred, and therefore, he/she can quickly deal with the occurred abnormality.

[Modification 1]

Next, a modification of the robot system 100 according to Embodiment 2 is described with reference to FIG. 10.

Figure 10:
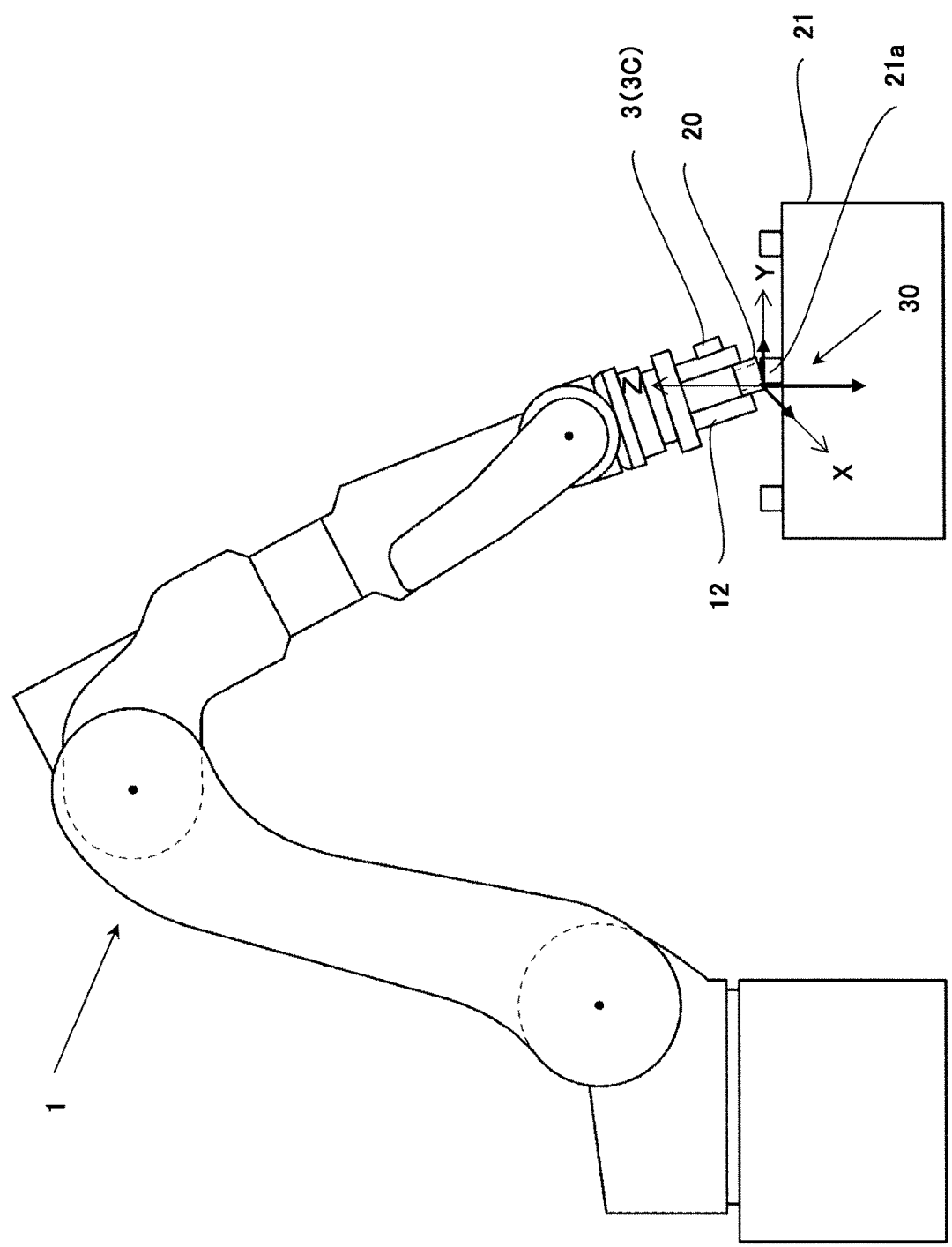
FIG. 10 is a schematic view illustrating a field of view of the operator viewing through a transparent type display unit in a robot system of Modification 1 of Embodiment 2.

FIG. 10 is a schematic view illustrating a field of view of the operator viewing through the transparent type display unit in a robot system of Modification 1 of Embodiment 2. Note that, in FIG. 10, a state where the protrusion 21a contacts an inner circumferential surface of the cylindrical workpiece 20 held by the robot 1 is illustrated.

As illustrated in FIG. 10, although the robot 1 of the robot system 100 of Modification 1 is the same in the fundamental configuration as the robot system 100 according to Embodiment 2, it is provided with a force sensor 3C provided to the sixth link 11f or the end effector 12 of the robot 1, as the sensor 3. The force sensor 3C is configured to detect a reaction force which acts on the end effector 12 from outside, or a force which acts externally by the end effector 12, and output components of the detected force (pressure information or force information) to the control device 4.

Then, the control device 4 displays the pressure information (force information) acquired from the force sensor 3C on the transparent type display unit 6, as the image screen 30. In detail, as illustrated in FIG. 10, the control device 4 expresses force components in X-direction, Y-direction, and Z-direction detected by the force sensor 3C by first arrows indicated as thick lines, and displays the first arrows, and second arrows indicating X-direction, Y-direction, and Z-direction of the robot 1 on the transparent type display unit 6, as the image screen 30. Note that, the X-, Y-, and Z-directions indicate directions on the basis of the robot 1, where the X-direction indicates a left-and-right direction of the robot 1, the Y-direction indicates a front-and-rear direction of the robot 1, and the Z-direction indicates the up-and-down direction of the robot 1.

At this time, the control device 4 may control the transparent type display unit 6 so that the image screen 30 is displayed near the workpiece 20 or the end effector 12, or may control the transparent type display unit 6 so that the image screen 30 is displayed in a portion where the force components in the X-direction and the Y-direction occur (a portion where the workpiece 20 contacts the protrusion 21*a*).

Note that the control device 4 may express torque components in the X-direction, the Y-direction, and the Z-direction detected by the force sensor 3C by arrows, and may display the arrows on the transparent type display unit 6, as the image screen 30.

Therefore, the operator can easily understand the direction of the force applied to the workpiece 20 and, thus, he/she becomes possible to intuitively operate the robot 1.

Moreover, when the force sensor 3C detects a pressure value at a first threshold set beforehand or above, the control device 4 may control the transparent type display unit 6 to output the abnormality information to the image screen 30. Here, the first threshold may be set suitably according to the type of the work to be performed by the robot 1, and may be a pressure value at which the workpiece 20 may be damaged, for example.

Even in the robot system 100 of Modification 1 thus configured, similar operation and effects to the robot system 100 according to Embodiment 2 can be obtained.

[Modification 2]

Figure 11:
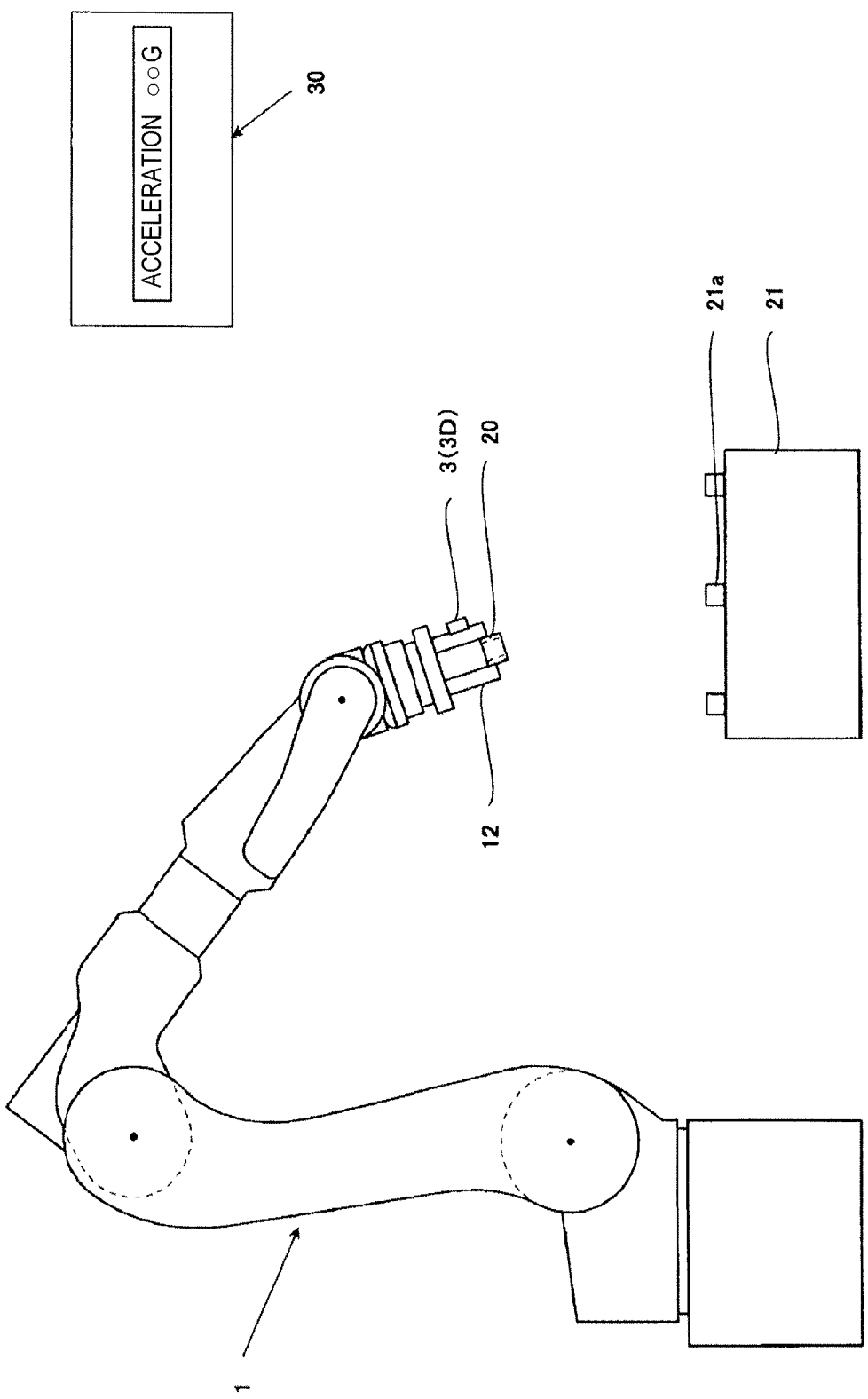
FIG. 11 is a schematic view illustrating a field of view of the operator viewing through a transparent type display unit in a robot system of Modification 2 of Embodiment 2.

FIG. 11 is a schematic view illustrating a field of view of the operator viewing through the transparent type display unit in a robot system of Modification 2 of Embodiment 2.

As illustrated in FIG. 11, although the robot 1 of the robot system 100 of Modification 2 is the same in the fundamental configuration as the robot system 100 according to Embodiment 2, it includes an acceleration sensor 3D provided to the end effector 12 of the robot 1 as the sensor 3. The acceleration sensor 3D is configured to detect an acceleration of the end effector 12 (accurately, the workpiece 20 gripped by the end effector 12), and output the detected acceleration to the control device 4 as acceleration information.

Then, the control device 4 displays the acceleration information acquired from acceleration sensor 3D on the transparent type display unit 6, as the image screen 30. In detail, as illustrated in FIG. 11, the control device 4 displays text information indicative of the acceleration information acquired from acceleration sensor 3D (acceleration ○○G) on the transparent type display unit 6, as the image screen 30.

Moreover, when the acceleration sensor 3D detects the acceleration at a first threshold set beforehand or above, the control device 4 may control the transparent type display unit 6 to output the abnormality information to the image screen 30. Here, as the first threshold, it can be set suitably according to the type of the work to be performed by the robot 1, and may be an acceleration at which the workpiece 20 may be damaged, for example.

Even in the robot system 100 of Modification 2 thus configured, similar operation and effects to the robot system 100 according to Embodiment 2 can be obtained.

[Modification 3]

Figure 12:
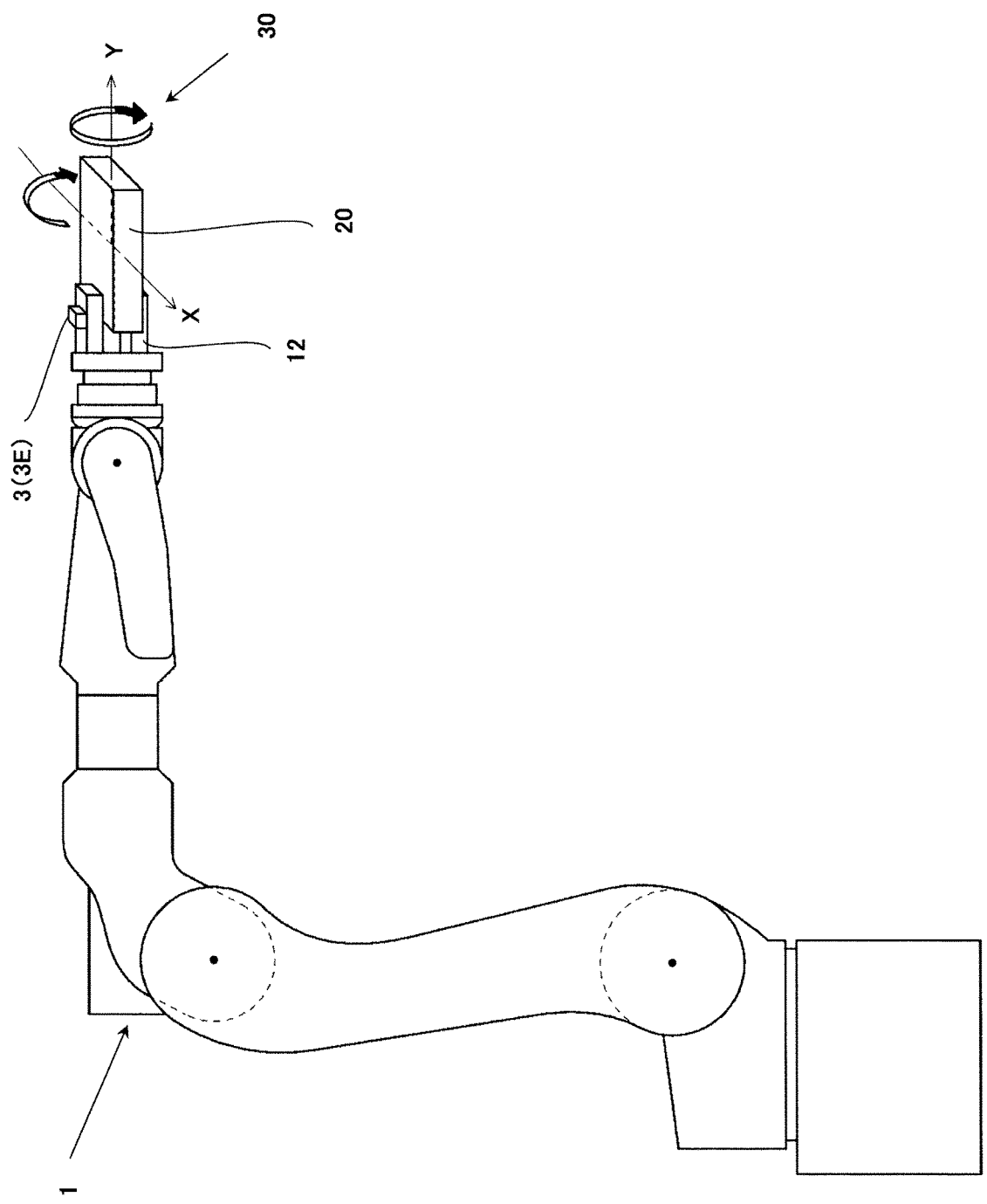
FIG. 12 is a schematic view illustrating a field of view of the operator viewing through a transparent type display unit in a robot system of Modification 3 of Embodiment 2.

FIG. 12 is a schematic view illustrating a field of view of the operator viewing through the transparent type display unit in a robot system of Modification 3 of Embodiment 2.

As illustrated in FIG. 12, although the robot 1 of the robot system 100 of Modification 3 is the same in the fundamental configuration as the robot system 100 according to Embodiment 2, it includes a gyrosensor 3E provided to the end effector 12 of the robot 1 as the sensor 3. The gyrosensor 3E is configured to detect an angle (or an angular velocity) of the end effector 12 (accurately, the workpiece 20 gripped by the end effector 12), and output the detected angle (or the angular velocity) to the control device 4, as the inclination information.

Then, the control device 4 displays the inclination information acquired from the gyrosensor 3E on the transparent type display unit 6, as the image screen 30. In detail, as illustrated in FIG. 12, the control device 4 expresses angle information of the workpiece 20 about the X-axis, and angle information of the workpiece 20 about the Y-axis by belt like arrows, and displays the belt like arrows and arrows indicating the X-axis and the Y-axis on the transparent type display unit 6, as the image screen 30. Note that the X-axis and the Y-axis are axes in the same directions as the X-direction and the Y-direction of the robot 1, respectively.

At this time, the control device 4 may express the angle information acquired from the gyrosensor 3E as a rate to the entire rotation about each axis (360 degrees). In detail, as illustrated in FIG. 12, in the belt like white arrow, a black portion indicates the rate of the rotation angle.

Therefore, the operator can easily understand the direction (angle) to which the workpiece 20 is turned, and becomes possible to intuitively operate the robot 1.

Moreover, when the gyrosensor 3E detects the angle at a first threshold set beforehand or above, the control device 4 may control the transparent type display unit 6 to output the abnormality information to the image screen 30. Here, the first threshold can be set suitably according to the type of the work to be performed by the robot 1, and, for example, when the workpiece 20 is a container which accommodates liquid or powder, it may be an angle at which the liquid etc. may fall from the container.

Even in the robot system 100 of Modification 3 thus configured, similar operation and effects to the robot system 100 according to Embodiment 2 can be obtained.

[Modification 4]

Figure 13:
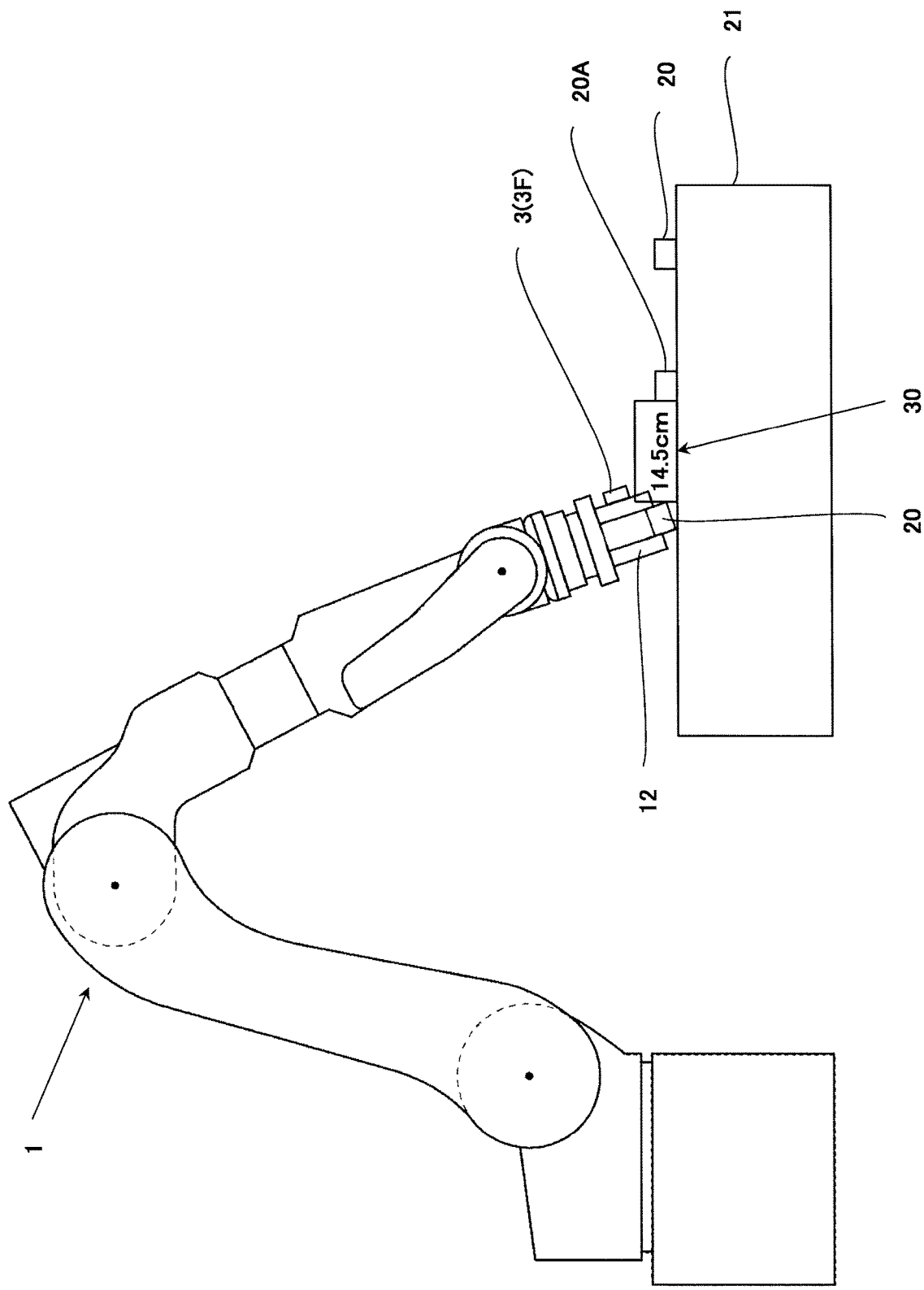
FIG. 13 is a schematic view illustrating a field of view of the operator viewing through a transparent type display unit in a robot system of Modification 4 of Embodiment 2.

FIG. 13 is a schematic view illustrating a field of view of the operator viewing through the transparent type display unit in a robot system of Modification 4 of Embodiment 2. Note that, in FIG. 13, a state where a work in which the workpiece 20 held by the robot 1 is placed at an equal interval (here, 15 cm) on the pedestal 21 is performed is illustrated.

As illustrated in FIG. 13, although the robot 1 of the robot system 100 of Modification 4 is the same in the fundamental configuration as the robot system 100 according to Embodiment 2, it includes a displacement sensor (position sensor) 3F provided to the end effector 12 of the robot 1, as the sensor 3. The displacement sensor 3F is configured to detect (measure) a distance between the workpiece 20 gripped by the end effector 12 and a workpiece 20A adjacent to the workpiece 20, and output the detected distance to the control device 4, as the positional information. Note that, in this modification the distance between the workpiece 20 gripped by the end effector 12 and the workpiece 20A adjacent to the workpiece 20 is 14.5 cm.

Then, the control device 4 displays the positional information acquired from the displacement sensor 3F on the transparent type display unit 6, as the image screen 30. In detail, as illustrated in FIG. 13, the control device 4 displays characters of the positional information (here, 14.5 cm)

acquired from the displacement sensor 3F on the transparent type display unit 6, as the image screen 30.

Therefore, the operator can easily understand the distance between the adjacent workpieces, and becomes possible to intuitively operate the robot 1.

Moreover, the control device 4 may control the transparent type display unit 6 to output the abnormality information to the image screen 30, when the displacement sensor 3F detects the distance at a first threshold set beforehand or above. Here, the first threshold can be set suitably according to the type of the work to be performed by the robot 1.

Even in the robot system 100 of Modification 4 thus configured, similar operation and effects to the robot system 100 according to Embodiment 2 can be obtained.

Note that, in Modification 4, although the displacement sensor 3F is provided as the position sensor, it is not limited to this configuration. For example, the rotation sensors which are disposed at the first to sixth joints JT1-JT6 of the robot 1 and detect the rotational positions of the drive motors (servo motors) may be used as the position sensors. In this case, the control device 4 may be configured to acquire the rotational positions of the drive motors detected by the rotation sensors, calculate position coordinates of the end effector 12 (workpiece 20) based on the rotational positions, and calculate the distance with the adjacent workpiece 20A based on the calculated position coordinates.

Embodiment 3

In the robot system according to Embodiment 1 or 2 (including the modifications), a robot system according to Embodiment 3 is further provided with an output device, and the control device is configured to output to the output device, after the completion of the given first process, an inquiry on which operating mode the robot is to be operated among three operating modes comprised of an automatic operating mode, a manual operating mode, and a hybrid operating mode for the second process which is the next process of the first process, and when the manual operating mode or the hybrid operating mode is selected, display the first information which is information detected by the sensor on the transparent type display unit, as the image screen.

Note that the automatic operating mode refers to that the robot operates automatically according to a preset program. Moreover, the manual operating mode refers to that the robot operates according to the operational instruction received from the user interface. The robot may be operated so as to completely follow the operational instruction received from the user interface, or the robot may be operated while correcting the operational instruction received from the user interface by using a preset program (for example, blurring correction). Further, the hybrid operating mode refers to that the robot under automatic operation is corrected by a manual operation.

Below, one example of the robot system according to Embodiment 3 is described with reference to FIGS. 14 and 15.

[Configuration of Robot System]

Figure 14:
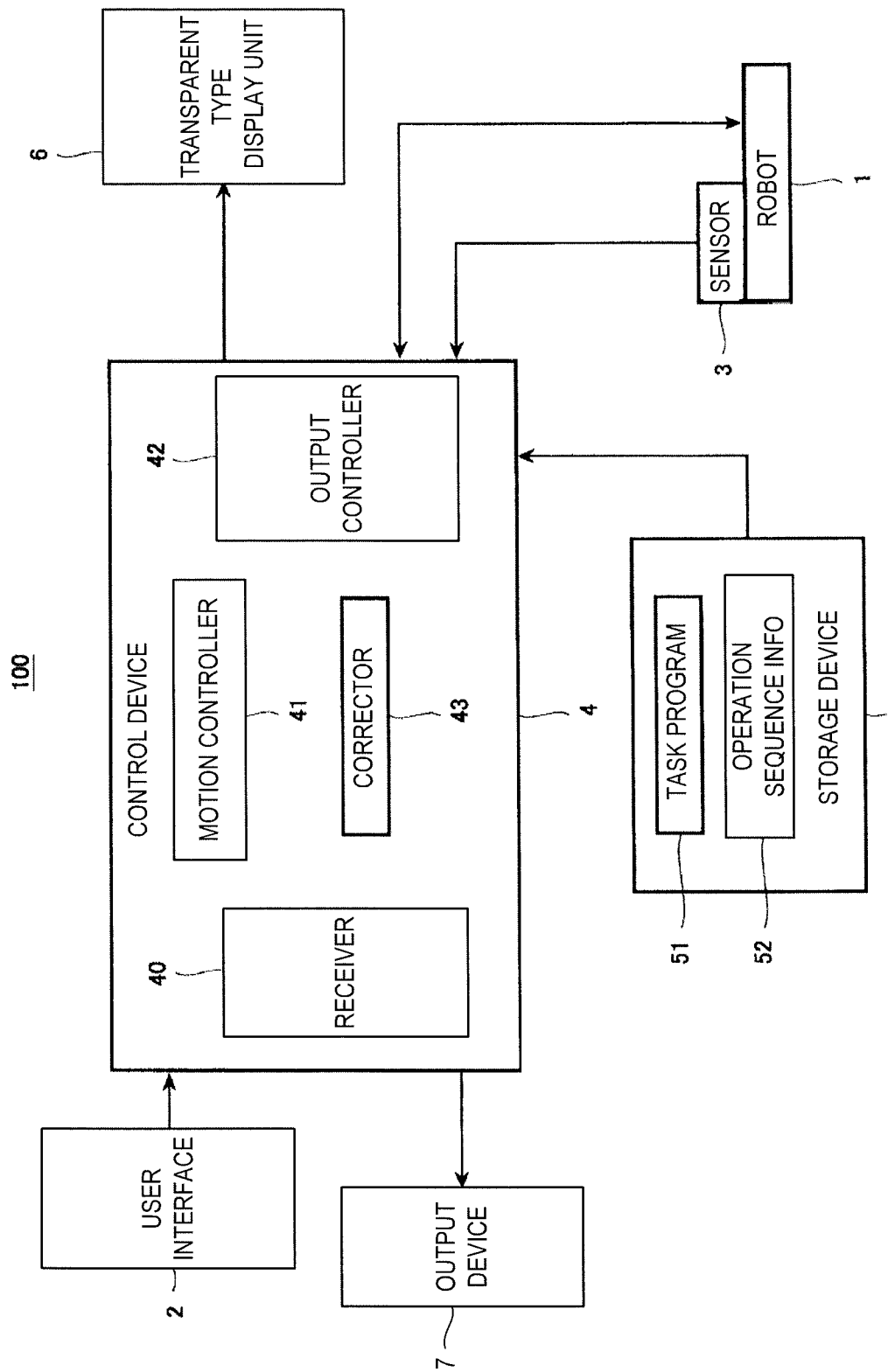
FIG. 14 is a block diagram illustrating an outline configuration of a robot system according to Embodiment 3.

FIG. 14 is a block diagram illustrating an outline configuration of a robot system according to Embodiment 3.

As illustrated in FIG. 14, although the robot system 100 according to Embodiment 3 is the same in the fundamental configuration as the robot system 100 according to Embodiment 1, but it differs in that it is further provided with an output device 7. Moreover, the robot system 100 according to Embodiment 3 differs from the robot system 100 according to Embodiment 1 in that the control device 4 includes a corrector 43.

The output device 7 is to output the information transmitted from the control device 4, and is configured to output the inquiry information on which operating mode the robot 1 is to be operated among the three operating modes comprised of the automatic operating mode, the manual operating mode, and the hybrid operating mode.

The output device 7 may be, for example, a display unit such as a monitor, a speaker, and a printer. For example, when the output device 7 is comprised of the display unit, it displays (outputs) the information transmitted from the control device 4 as a projection of character(s), a picture, an image, and an animation or videos. Moreover, when the output device 7 is comprised of the speaker, it outputs the information transmitted from the control device 4 as audio information. Further, when the output device 7 is comprised of the printer, it prints out the information transmitted from the control device 4. Note that the transparent type display unit 6 may also serve as the output device 7.

When the receiver 40 receives an input signal indicative of a correction instruction during the hybrid operation of the robot 1, the corrector 43 of the control device 4 instructs a correction of the operation of the robot 1 to the motion controller 41. In detail, when the receiver 40 receives the correction instruction signal as the input signal from the user interface 2 during the hybrid operation of the robot 1, the corrector 43 instructs to the motion controller 41, and instructs the motion controller 41 to correct the operation by the automatic operation of the robot 1 to operation according to the correction instruction signal from the user interface 2. Note that the motion controller 41 controls the robot 1 so that the operation reflects the correction instruction from the user interface 2 according to the instruction from the corrector 43.

Moreover, in the robot system 100 according to Embodiment 3, when the receiver 40 receives the operational instruction from the user interface 2 as the input signal, the motion controller 41 of the control device 4 determines the operating mode of the process to be carried out by the robot 1 in a series of works by using this operational instruction as a trigger. The motion controller 41 can perform the determination of the operating mode of the process to be carried out by the robot 1 next, with reference to the operation sequence information 52 stored in the storage device 5. When the operating mode is determined, the motion controller 41 controls the robot 1 to operate in the determined operating mode.

For example, if the motion controller 41 determines that the robot 1 is to be automatically operated, it reads the operation sequence information 52, and controls the robot 1 to carry out the operation defined by the program included in the operation sequence information 52.

Moreover, if the motion controller 41 determines that the robot 1 is to be manually operated, it controls the robot 1 to operate based on the operational instruction received by the receiver 40 from the user interface 2.

Further, if the motion controller 41 determines that the robot 1 is to be hybridly operated, it reads the operation sequence information 52, and carries out the operation defined by the program included in the operation sequence information 52. Then, when the receiver 40 receives the correction instruction signal as the input signal from the user interface 2 during the automatic operation of the robot 1, the motion controller 41 corrects the operation by the automatic operation of the robot 1 to the operation according to the correction instruction signal from the user interface 2. Then, when the output of the correction instruction signal from the user interface 2 and the receiver 40 stops the reception of the correction instruction signal, or when the receiver 40 receives a signal for instructing a resumption of the automatic operation of the robot 1 from the user interface 2, the motion controller 41 resumes the automatic operation of the robot 1.

Note that, in the case where the robot 1 is operated in the automatic operating mode, the motion controller 41 may transmit information indicating the termination of the automatic operating mode to the output controller 42, after the automatic operating mode of the robot 1 is completed. Thus, by the output controller 42 outputting the information indicating the termination of the automatic operating mode to the output device 7 for the operator, the operator can understand that the automatic operating mode is terminated.

Moreover, after the termination of a given process, the motion controller 41 outputs the inquiry information on which operating mode the robot 1 is to be operated among the three operating modes comprised of the automatic operating mode, the manual operating mode, and the hybrid operating mode, to the output controller 42.

For example, when the output controller 42 receives information indicating a start of the automatic operation from the motion controller 41, or when the output controller 42 receives the information indicating a start of the manual operation from the user interface 2 from the motion controller 41 through the receiver 40, or when the output controller 42 receives the input signal indicative of the correction instruction from the user interface 2, from the motion controller 41 through the receiver 40 during the hybrid operation of the robot 1, the output controller 42 may control the output device 7 to output the information.

Moreover, when the output controller 42 receives information indicating a termination of the automatic operation from the motion controller 41, or when the output controller 42 receives information indicating a termination of the manual operation from the user interface 2 or information indicating a termination of the hybrid operation, from the motion controller 41 through the receiver 40, the output controller 42 may control the output device 7 to output the information.

Further, when the output controller 42 receives the inquiry information from the motion controller 41, the output controller 42 controls the output device 7 to output the information. Thus, the operator can select the operating mode in which the robot 1 is to be operated from the three operating modes, and by operating the user interface 2, the selection information can be outputted to the receiver 40 of the control device 4.

Moreover, in the robot system 100 according to Embodiment 3, the user interface 2 is configured to output the operating mode selected by the operator from the three operating modes, as the selection information. When the manual operating mode or the hybrid operating mode is terminated by the operator's operation, the user interface 2 may be configured to output information indicating a termination of the operating mode. Note that the user interface 2 may be separately provided with an input part where a start instruction of a work, a notice of completion of the work by the manual operation, etc. are inputted.

[Operation and Effects of Robot System]

Next, operation and effects of the robot system 100 according to Embodiment 3 are described with reference to FIGS. 14 and 15. Note that the following operation is executed by the processor of the control device 4 reading the program stored in the memory or the storage device 5.

Figure 15:
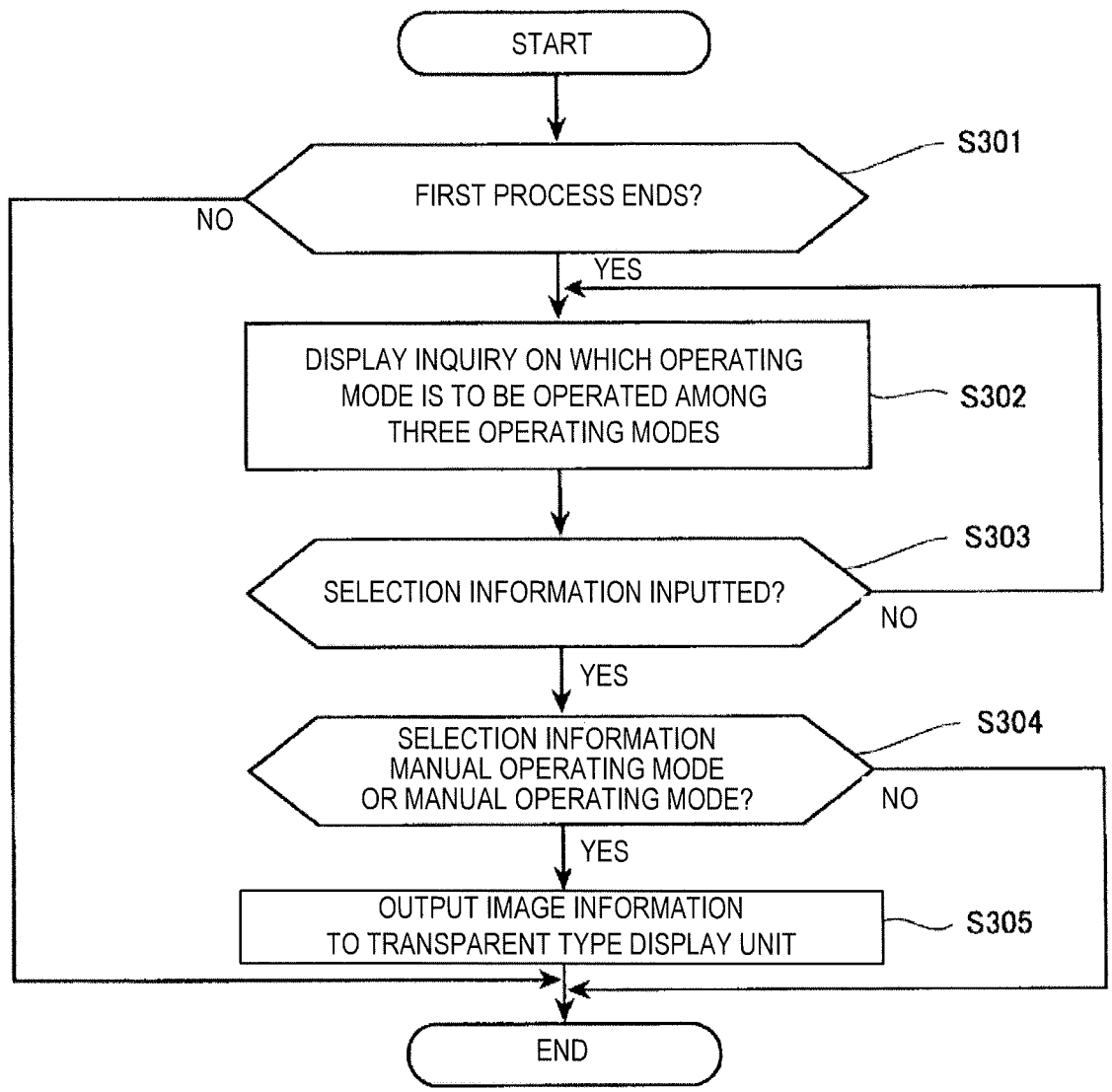
FIG. 15 is a flowchart illustrating one example of operation of the robot system according to Embodiment 3.

FIG. 15 is a flowchart illustrating one example of operation of the robot system according to Embodiment 3.

As illustrated in FIG. 15, the control device 4 determines whether the first process which is at least one of the plurality of processes is ended (Step S301). In detail, the motion controller 41 of the control device 4 determines whether the automatic operation is ended, or whether information indicating a termination of the manual operation is received from the user interface 2 or information indicating a termination of the hybrid operation is received, through the receiver 40.

If the motion controller 41 of the control device 4 determines that the automatic operation has not ended, or the information indicating the termination of the manual operation has not received from the user interface 2 or the information indicating the termination of the hybrid operation has not received, through the receiver 40 (No at Step S301), it ends this program. Note that, when the control device 4 ends this program, it executes this program again, for example, after 50 msec.

On the other hand, if the motion controller 41 of the control device 4 determines that the automatic operation is ended, or the information indicating the termination of the manual operation is received from the user interface 2 or the information indicating the termination of the hybrid operation is received, through the receiver 40 (Yes at Step S301), it performs processing at Step S302.

At Step S302, the control device 4 displays (outputs) on/to the output device 7 the inquiry information on which operating mode the robot 1 is to be operated among the three operating modes comprised of the automatic operating mode, the manual operating mode, and the hybrid operating mode. In detail, the motion controller 41 of the control device 4 outputs the inquiry information to the output device 7 through the output controller 42. Then, by the output device 7 acquiring the inquiry information, the inquiry information on which operating mode the robot 1 is to be operated among the three operating modes is displayed to the operator.

In response to this, the operator selects one of the three operating modes, and operates the user interface 2 to output the selected operating mode as the selection information.

Next, the motion controller 41 of the control device 4 determines whether the selection information is inputted into the receiver 40 from the user interface 2 (Step S303). If the motion controller 41 determines that the selection information is not inputted into the receiver 40 from the user interface 2 (No at Step S303), it returns to Step S302 and repeats Step S302 and Step S303 until the selection information is inputted into the receiver 40 from the user interface 2. On the other hand, if the motion controller 41 determines that the selection information is inputted into the receiver 40 from the user interface 2 (Yes at Step S303), it transits to Step S304.

At Step S304, the motion controller 41 of the control device 4 determines whether the selection information inputted through the receiver 40 from the user interface 2 is the manual operating mode or the hybrid operating mode.

If the motion controller 41 of the control device 4 determines that the selection information acquired at Step S303 is the automatic operating mode (No at Step S304), it ends this program. On the other hand, if the motion controller 41 of the control device 4 determines that the selection information acquired at Step S303 is the manual operating mode or the hybrid operating mode (Yes at Step S304), it outputs the first information detected by the sensor 3 to the transparent type display unit 6, as the image screen (Step S305). In detail, the control device 4 displays the image imaged by the camera 3A on the transparent type display unit 6.

Then, the control device 4 ends this program. Note that, when the control device 4 ends this program, it executes this program again, for example, after 50 msec.

In the robot system 100 according to Embodiment 3 thus configured, when the operator selects the operating mode of the robot 1 from the manual operating mode or the hybrid operating mode, the control device 4 displays the first information detected by the sensor 3 on the transparent type display unit 6, as the image screen. When operating the robot 1 in the manual operating mode or the hybrid operating mode, the operator operates the user interface 2 to operate the robot 1. Thus, when the first information detected by the sensor 3 is required, the first information can be displayed on the transparent type display unit 6, as the image screen. Thus, the operator's burden can be reduced and the work efficiency can be improved.

Note that, in Embodiment 3, although the sensor 3 is comprised of the camera 3A, it is not limited to this configuration. The sensor 3 may be comprised of various kinds of sensors, such as a vibration sensor.

Embodiment 4

In the robot system according to at least any one of Embodiments 1-3 (including the modifications), a robot system according to Embodiment 4 is configured so that the sensor is comprised of a camera, and when the robot is operated by the user interface, the control device displays the image information imaged by the camera on the transparent type display unit, as the image screen.

Moreover, in the robot system according to Embodiment 4, the control device may be configured to display the image screen on the transparent type display unit, while changing the size of the image screen according to an operating speed of the robot.

Further, in the robot system according to Embodiment 4, the image information imaged by the camera may be displayed on the transparent type display unit so that the size of the image screen is increased as the operating speed of the robot becomes slower.

Below, one example of the robot system according to Embodiment 4 is described with reference to FIGS. 13 to 15. Note that, since the robot system 100 according to Embodiment 4 has a similar configuration to the robot system 100 according to Embodiment 1, the detailed description of the configuration is omitted.

Figure 16:
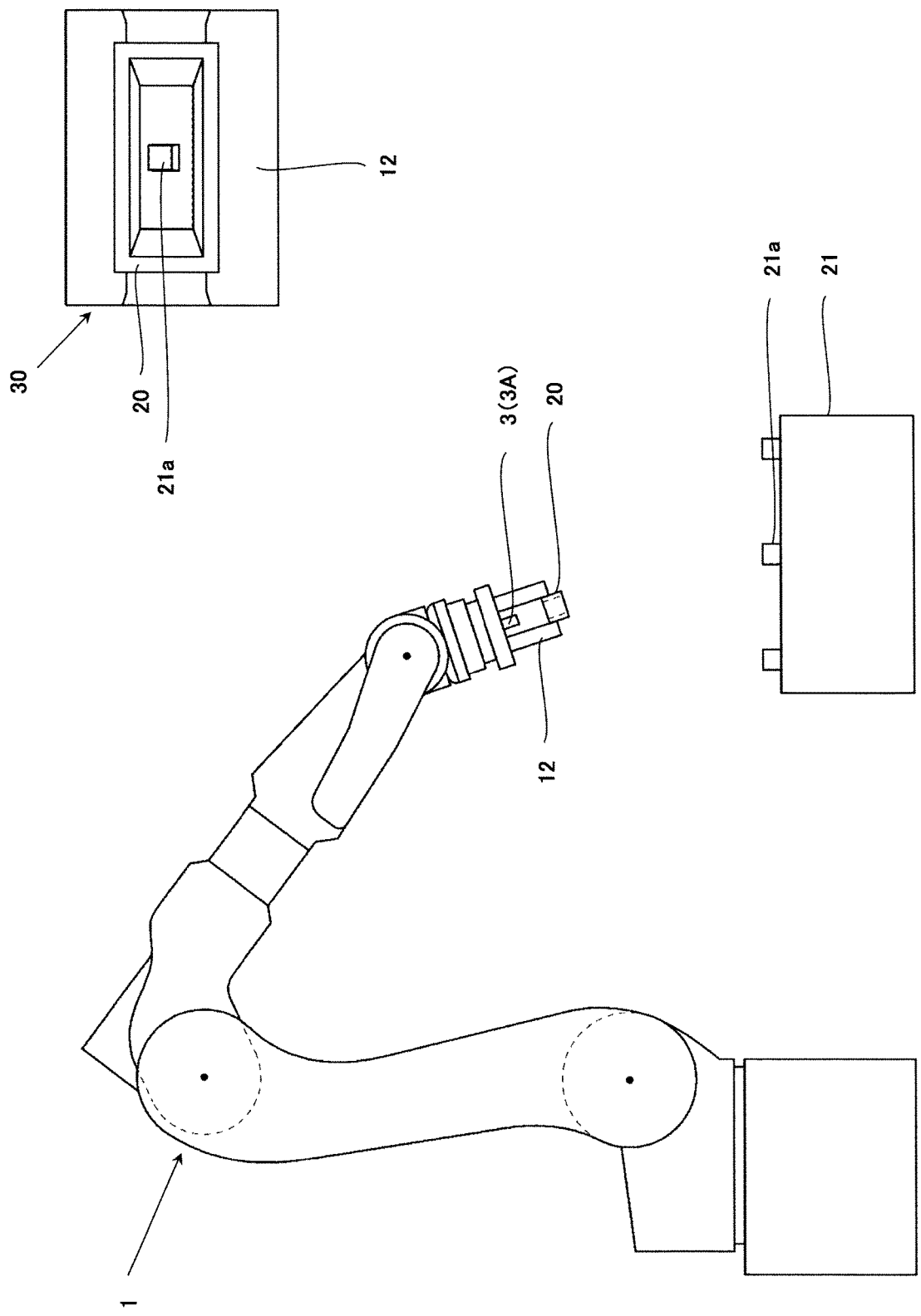
FIG. 16 is a schematic view illustrating a field of view of the operator viewing through a transparent type display unit in a robot system according to Embodiment 4.
Figure 17:
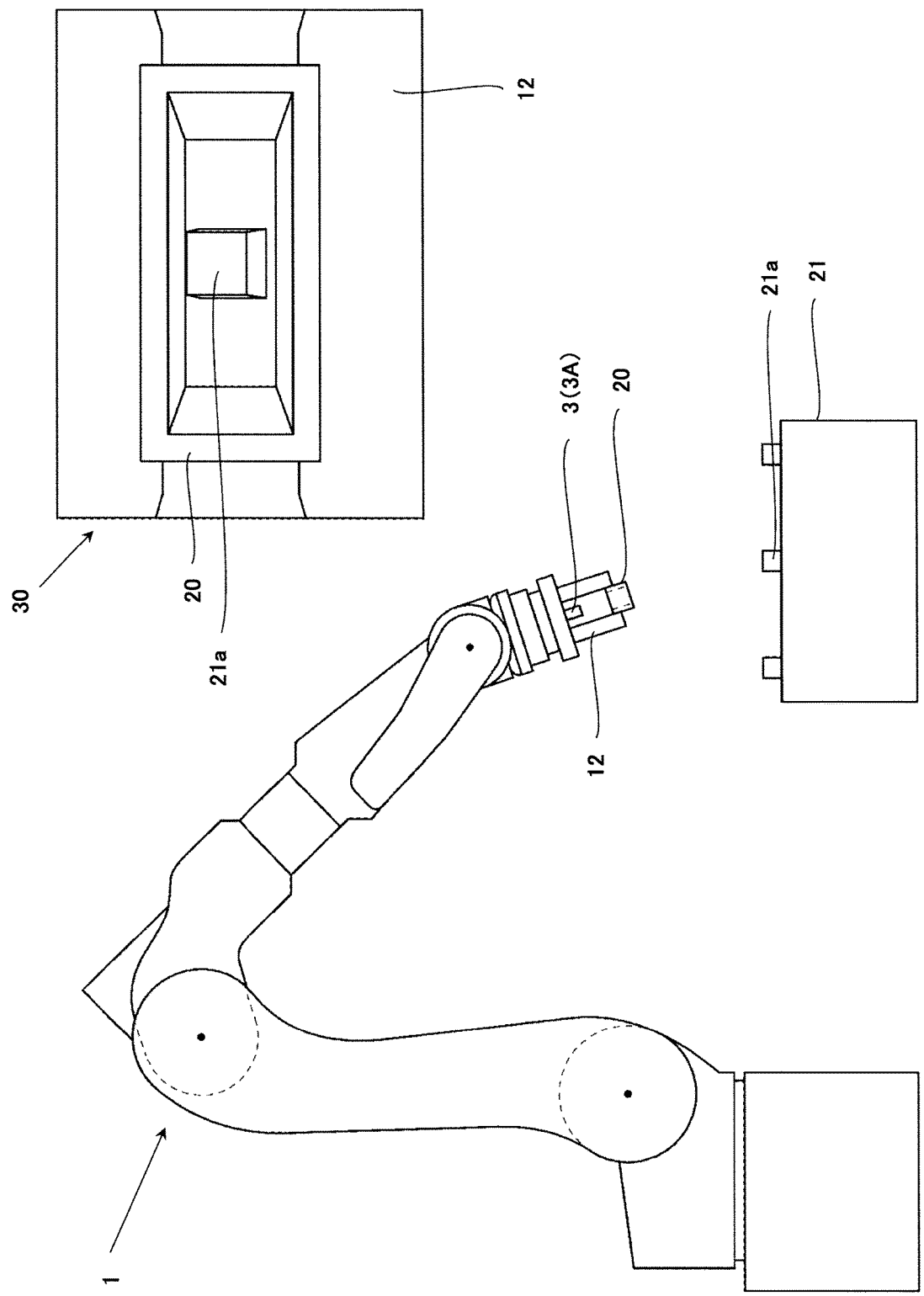
FIG. 17 is a schematic view illustrating a field of view of the operator viewing through the transparent type display unit in the robot system according to Embodiment 4.
Figure 18:
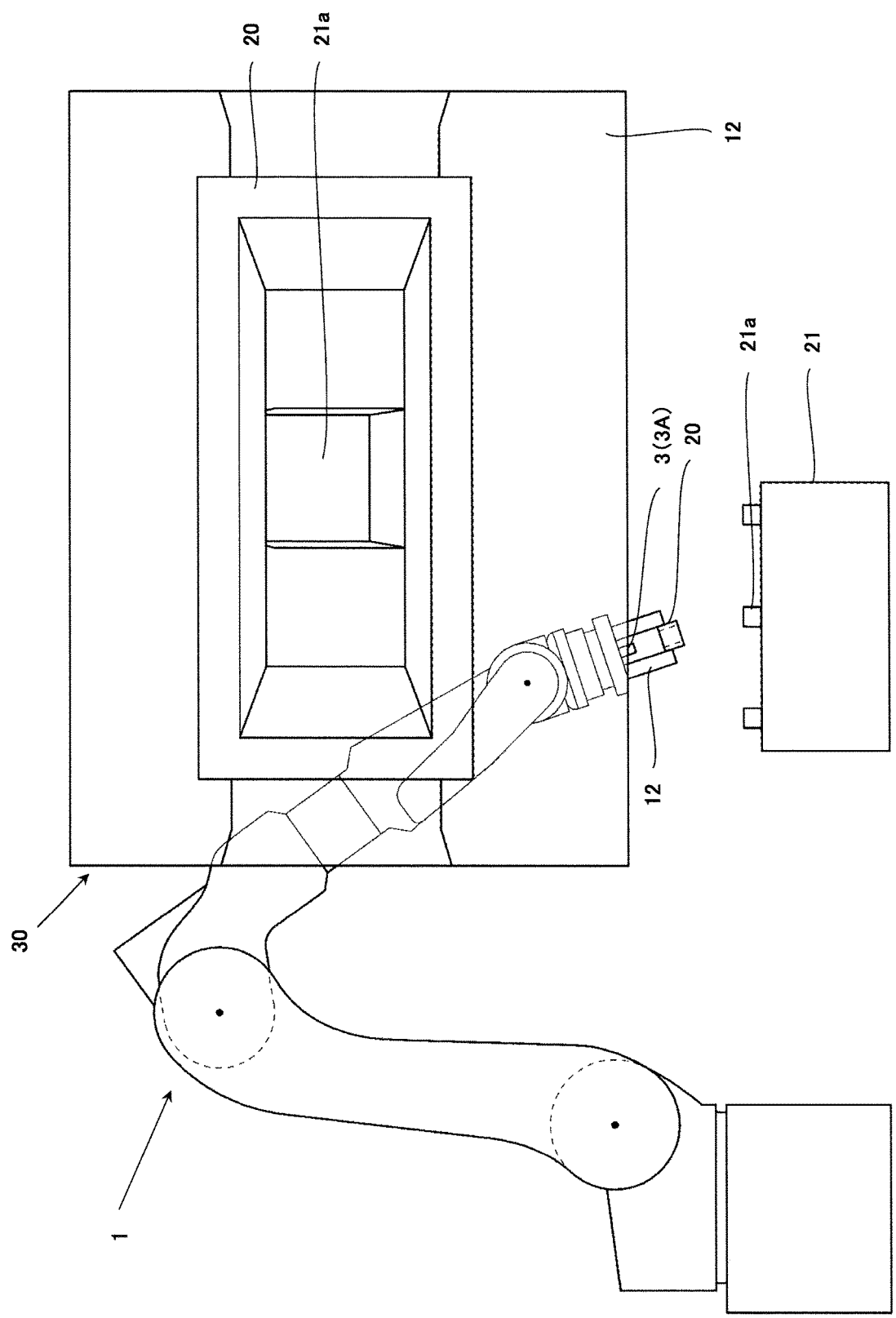
FIG. 18 is a schematic view illustrating a field of view of the operator viewing through the transparent type display unit in the robot system according to Embodiment 4.

FIGS. 16 to 18 are the schematic views illustrating a field of view of the operator viewing through the transparent type display unit in the robot system according to Embodiment 4. Note that, in FIGS. 16 to 18, the operating speed of the robot 1 is smaller in this order of the figures.

As illustrated in FIGS. 16 to 18, the control device 4 controls the transparent type display unit 6 to change the size of the image screen 30 which projects the image information imaged by the camera 3A displayed on the transparent type display unit 6 according to the operating speed of the robot 1. In detail, the control device 4 controls the transparent type display unit 6 to increase the size of the image screen 30 which projects the image information imaged by the camera 3A as the operating speed of the robot 1 becomes slower.

At this time, the control device 4 may control the transparent type display unit 6 so that the size of the image screen 30 is smoothly increased in inverse proportion to the operating speed of the robot 1. Moreover, the control device 4 may control the transparent type display unit 6 so that a relation between the operating speed of the robot 1 and the size of the image screen 30 becomes a function expressed by a high order function such as a quadratic function or a cubic function, an exponential function, or a logarithmic function. Further, the control device 4 may control the transparent type display unit 6 so that the size of the image screen 30 is increased in a stepped manner according to the operating speed of the robot 1.

Even in the robot system 100 according to Embodiment 4 thus configured, similar operation and effects to the robot system 100 according to Embodiment 1 can be obtained.

As described above, for example, when causing the robot 1 to perform the operation which requires the positioning of the tip-end part of the robot 1 (end effector 12), the operating speed of the robot 1 is decreased in order for the operator to carefully operate the robot 1. At this time, the operator carefully views the image information near the tip-end part of the robot 1.

Thus, in the robot system 100 according to Embodiment 4, the control device 4 controls the transparent type display unit 6 to increase the size of the image screen 30 as the operating speed of the robot 1 becomes slower.

Therefore, the image screen 30 becomes easier to be viewed, the operator's burden can be further reduced, and the work efficiency can be further improved.

Embodiment 5

In the robot system of at least any one of Embodiments 1-4 (including the modifications), a robot system according to Embodiment 5 is configured so that the sensor is comprised of a camera, and the control device displays the image screen on the transparent type display unit, while changing the transparency of the image screen according to the operating speed of the robot.

Moreover, in the robot system according to Embodiment 5, the control device is configured to display the image information imaged by the camera on the transparent type display unit, while reducing the transparency of the image screen as the operating speed of the robot becomes slower.

Below, one example of the robot system according to Embodiment 5 is described with reference to FIGS. 19 to 21. Note that, since the robot system 100 according to Embodiment 5 has a similar configuration to the robot system 100 according to Embodiment 1, the detailed description of the configuration is omitted.

Figure 19:
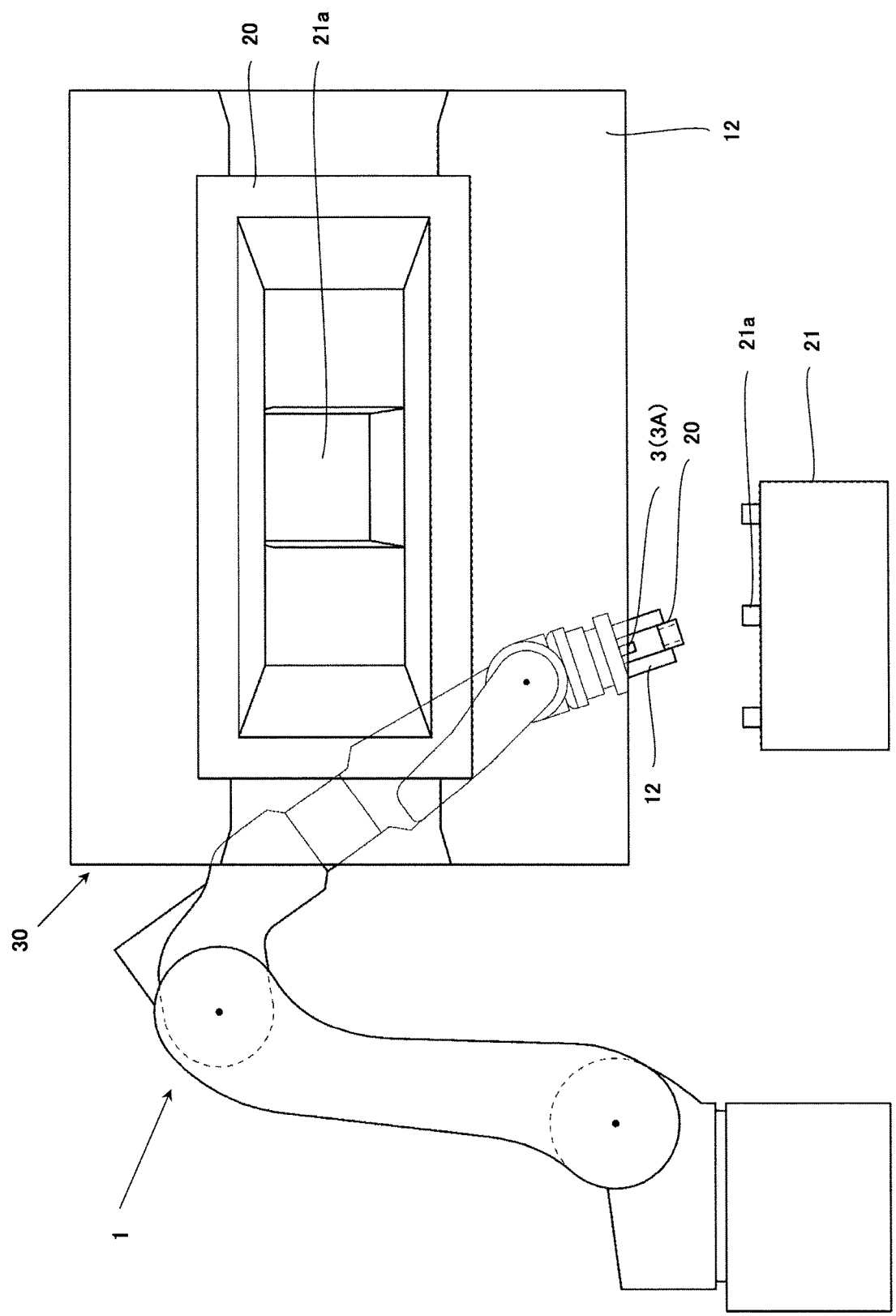
FIG. 19 is a schematic view illustrating a field of view of the operator viewing through a transparent type display unit in a robot system according to Embodiment 5.
Figure 20:
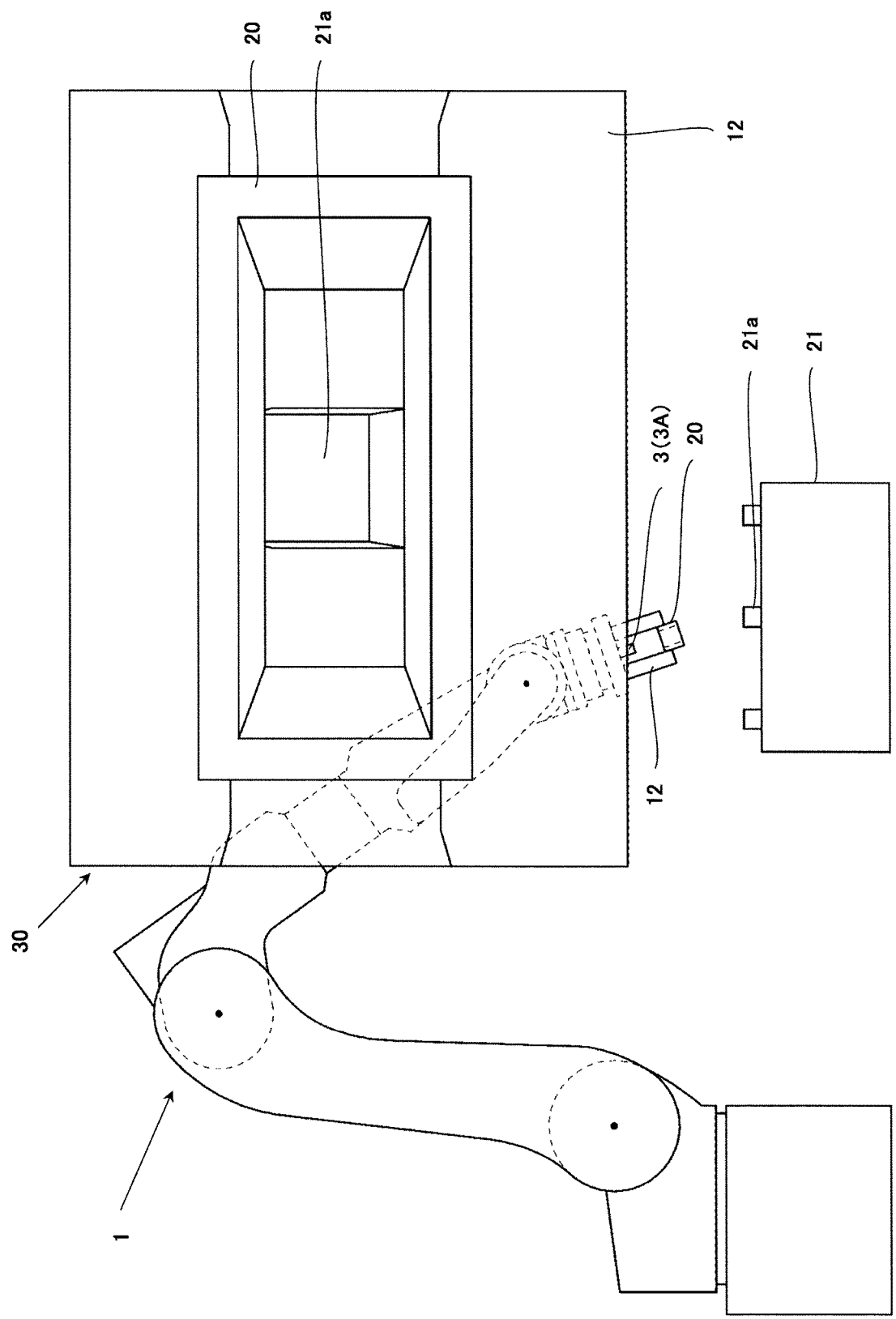
FIG. 20 is a schematic view illustrating a field of view of the operator viewing through the transparent type display unit in the robot system according to Embodiment 5.
Figure 21:
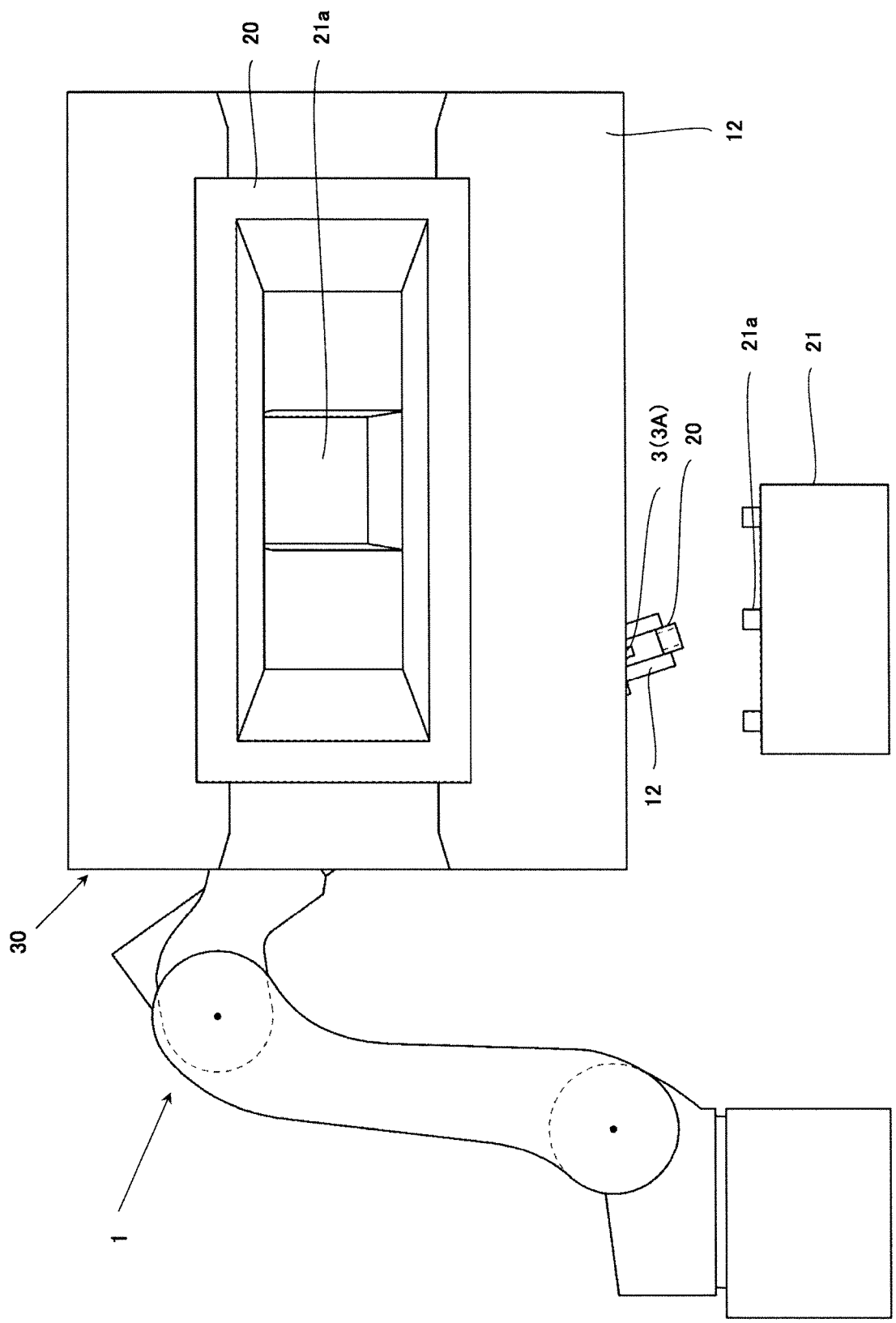
FIG. 21 is a schematic view illustrating a field of view of the operator viewing through the transparent type display unit in the robot system according to Embodiment 5.

FIGS. 19 to 21 are schematic views illustrating a field of view of the operator viewing through the transparent type display unit in the robot system according to Embodiment 5. Note that, in FIGS. 19 to 21, the operating speed of the robot 1 is smaller in this order of the figures.

As illustrated in FIGS. 19 to 21, the control device 4 controls the transparent type display unit 6 to change the transparency of the image screen 30 which projects the image information imaged by the camera 3A displayed on the transparent type display unit 6 according to the operating speed of the robot 1. In detail, the control device 4 controls the transparent type display unit 6 to reduce the transparency of the image screen 30 which projects the image information imaged by the camera 3A displayed on the transparent type display unit 6 as the operating speed of the robot 1 becomes slower.

At this time, the control device 4 may control the transparent type display unit 6 so that the transparency of the image screen 30 is smoothly reduced in proportion to the operating speed of the robot 1. Moreover, the control device 4 may control the transparent type display unit 6 so that a relation between the operating speed of the robot 1 and the transparency of the image screen 30 becomes a function expressed by a high order function such as a quadratic function or a cubic function, an exponential function, or a logarithmic function. Further, the control device 4 may control the transparent type display unit 6 so that the transparency of the image screen 30 is reduced in a stepped manner according to the operating speed of the robot 1.

As described above, for example, when causing the robot 1 to perform the operation which requires the positioning of the tip-end part of the robot 1 (end effector 12), the operator carefully views the image information near the tip-end part of the robot 1. At this time, for example, if the image screen 30 and the robot 1 are displayed in an overlapped manner on the display part 6a of the transparent type display unit 6, it may be difficult for the operator to see the image screen 30.

Thus, in the robot system 100 according to Embodiment 5, the control device 4 controls the transparent type display unit 6 to reduce the transparency of the image screen 30 as the operating speed of the robot 1 becomes slower. Therefore, for the operator, for example, the robot 1 which is located as a background of the image screen 30 disappears, and thereby, the image screen 30 can be easier to be viewed. Thus, the operator's burden can be further reduced and the work efficiency can be further improved.

Embodiment 6

In the robot system according to at least any one of Embodiments 1-5 (including the modifications), a robot system according to Embodiment 6 is configured so that the sensor is comprised of a camera, and the control device changes the color of the image screen imaged by the camera which is displayed on the transparent type display unit according to the operating speed of the robot.

Moreover, in the robot system according to Embodiment 6, the control device may be configured, when the operating speed of the robot is the given first speed set beforehand or below, to display the image information imaged by the camera in the image screen as a monochrome image on the transparent type display unit, and when the operating speed of the robot is above the first speed, to display the image screen imaged by the camera in the image screen as a color image.

Below, one example of the robot system according to Embodiment 6 is described with reference to FIG. 22. Note that, since the robot system 100 according to Embodiment 6 has a similar configuration to the robot system 100 according to Embodiment 1, the detailed description of the configuration is omitted.

Figure 22:
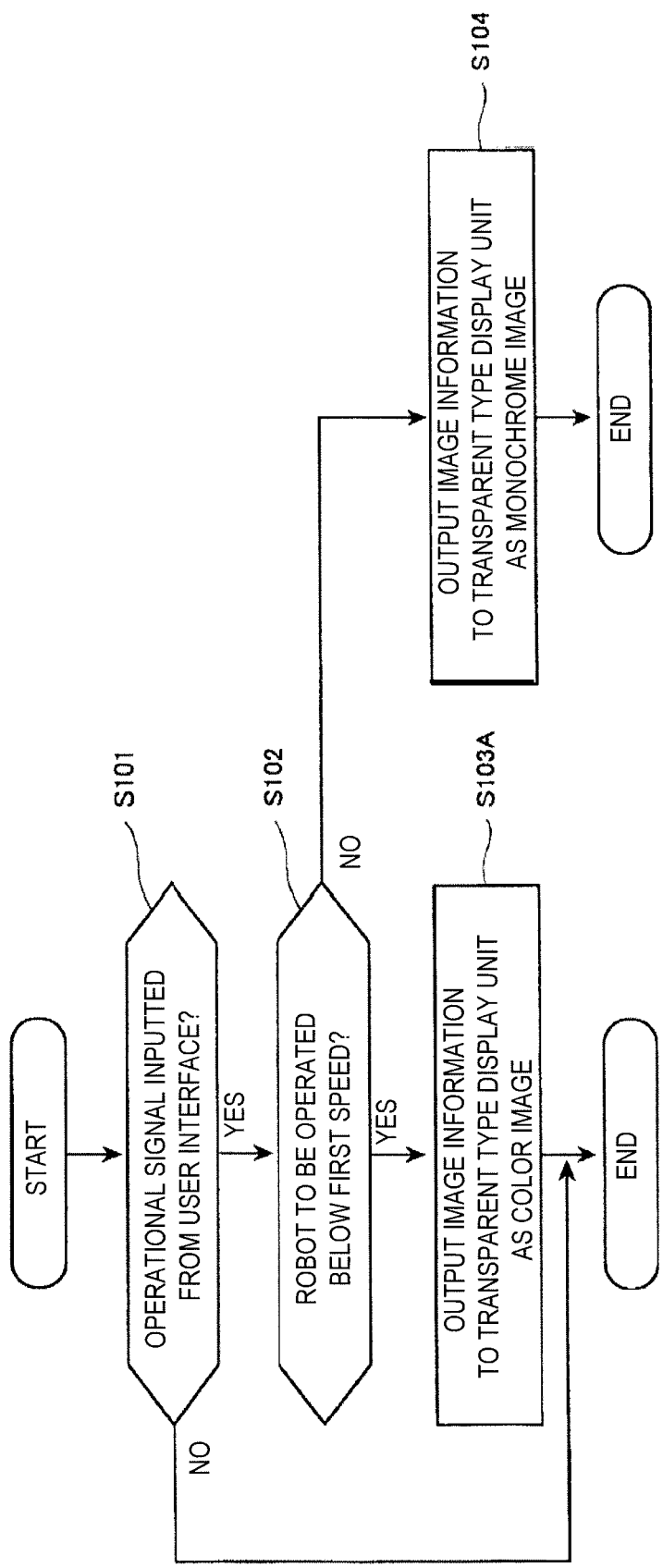
FIG. 22 is a flowchart illustrating one example of operation of a robot system according to Embodiment 6.

FIG. 22 is a flowchart illustrating one example of operation of the robot system according to Embodiment 6.

As illustrated in FIG. 22, the operation of the robot system 100 according to Embodiment 6 is fundamentally the same as the operation of the robot system 100 according to Embodiment 1, but the operations at and after Step S102 differ. In detail, the operations at and after the determination by the control device 4 whether the robot 1 is to be operated at the first speed or below differ.

If the control device 4 determines that the robot 1 is to be operated at the first speed or below (Yes at Step S102), it outputs the image information inputted from the camera 3A to the transparent type display unit 6 as the color image (step S103A), and ends this program. Note that, when the control device 4 ends this program, it executes this program again, for example, after 50 msec.

On the other hand, if the control device 4 determines that the robot 1 is to be operated above the first speed (No at Step S102), it outputs the image information inputted from the camera 3A to the transparent type display unit 6 as the monochrome image (Step S104), and ends this program. Note that, when the control device 4 ends this program, it executes this program again, for example, after 50 msec.

Even in the robot system 100 according to Embodiment 6 thus configured, similar operation and effects to the robot system 100 according to Embodiment 1 can be obtained.

As described above, when causing the robot 1 to perform the operation which requires the positioning of the tip-end part of the robot 1 (end effector 12), the operator carefully views the image information near the tip-end part of the robot 1.

Thus, in the robot system 100 according to Embodiment 6, when the operating speed of the robot 1 is the first speed or below, the control device 4 displays the image screen 30 on the transparent type display unit 6 as the color image. Therefore, the image screen 30 can be easier to be viewed for the operator. Thus, the operator's burden can be further reduced and the work efficiency can be further improved.

Embodiment 7

In the robot system according to at least any one of Embodiments 1-6 (including the modifications), the robot system according to Embodiment 7 is configured so that a memory which stores a first operating area which is an area where the robot is operable in a given process is further provided, and when the robot is operated by the user interface, the control device displays the first operating area on the transparent type display unit.

Below, one example of the robot system according to Embodiment 7 is described with reference to FIG. 23. Note that, since the robot system 100 according to Embodiment 7 has a similar configuration to the robot system 100 according to Embodiment 1, the detailed description of the configuration is omitted.

Figure 23:
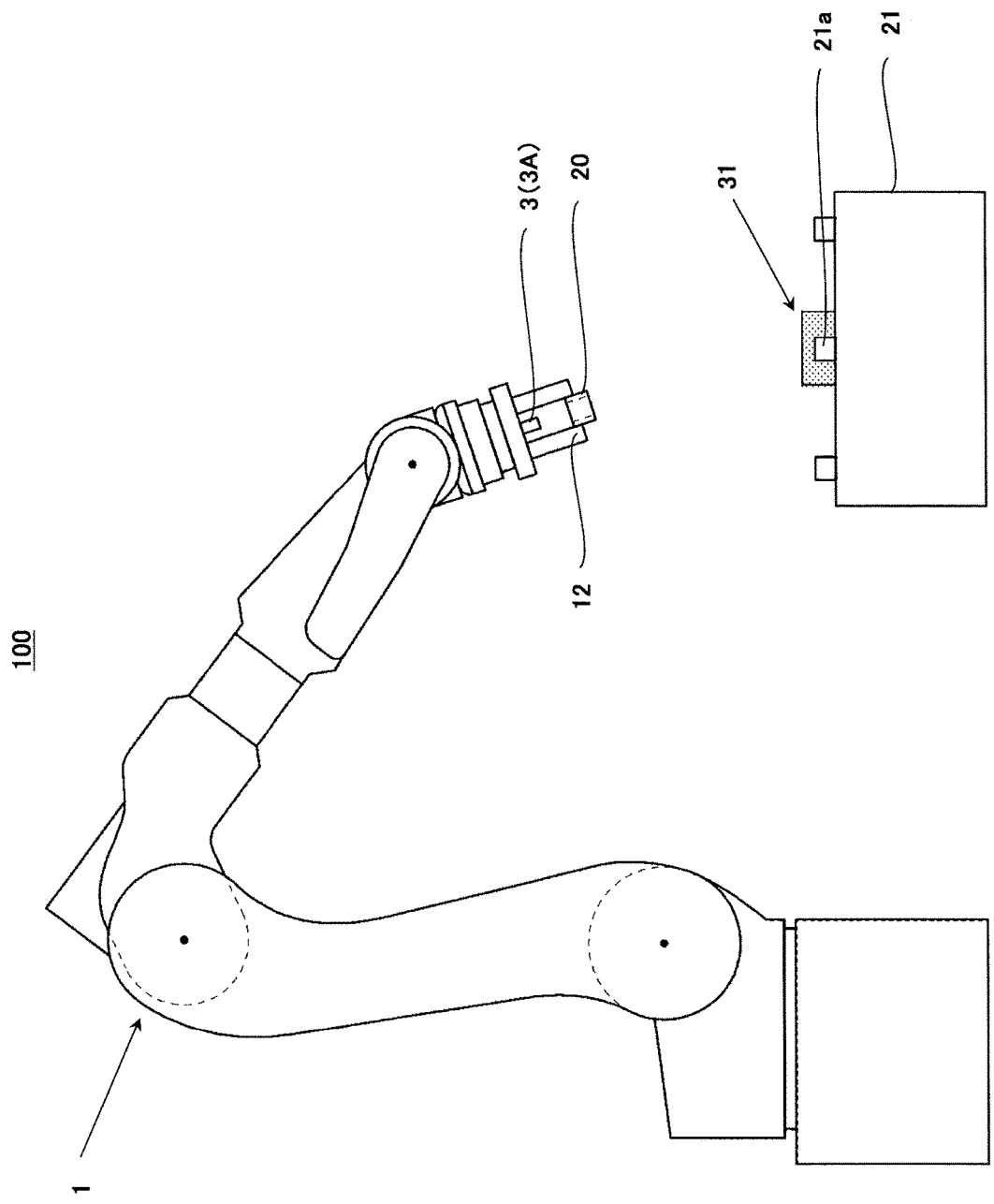
FIG. 23 is a schematic view illustrating a field of view of the operator viewing through a transparent type display unit in a robot system according to Embodiment 7.

FIG. 23 is a schematic view illustrating a field of view of the operator viewing through the transparent type display unit in the robot system according to Embodiment 7.

As illustrated in FIG. 23, in the robot system 100 according to Embodiment 7, when the operator operates the user interface 2 to operate the robot 1, the control device 4 displays a first operating area 31 stored beforehand in the storage device 5 on the transparent type display unit 6.

Here, the first operating area 31 is an area where the robot 1 is operable in the given process, and is an area used as an index when a worker operates the robot 1 to cause the robot 1 to perform the given process. The first operating area 31 can be suitably set beforehand by an experiment etc., and is suitably set according to the type of the work to be performed by the robot 1.

The first operating area 31 may be a range (area) where, for example, the robot 1 is operable and is defined according to the size of the robot 1, a movable range of each joint, etc. Moreover, the first operating area 31 may be a range (area) where the workpiece 20 gripped by the robot 1 is movable. Further, the first operating area 31 may be a range (area) of −10 to +10 cm from the path of the workpiece 20 when the robot 1 optimally performs the work (when the robot 1 is able to finish the work the fastest).

As illustrated in FIG. 23, in Embodiment 7, the control device 4 displays a range where the workpiece 20 can be located in order to fit the workpiece 20 held by the robot 1 onto the protrusion 21a (a range where the workpiece 20 is movable; a hatched portion) on the transparent type display unit 6, as the first operating area 31. That is, in Embodiment 7, the control device 4 displays the first operating area 31 on the transparent type display unit 6, as augmented reality.

Therefore, the operator can easily operate the robot 1 and can improve the work efficiency.

Even in the robot system 100 according to Embodiment 7 thus configured, similar operation and effects to the robot system 100 according to Embodiment 1 can be obtained.

Note that the first operating area 31 may be stored in the storage device 5 so that its area in changed according to the operating speed of the robot 1. In detail, the first operating area 31 may be stored in the storage device 5 so that its area is reduced as the operating speed of the robot 1 becomes slower.

[Modification 1]

Next, a modification of the robot system 100 according to Embodiment 7 is described with reference to FIG. 24. Note that, since a robot system 100 of Modification 1 has a similar configuration to the robot system 100 according to Embodiment 1, the detailed description of the configuration is omitted.

Figure 24:
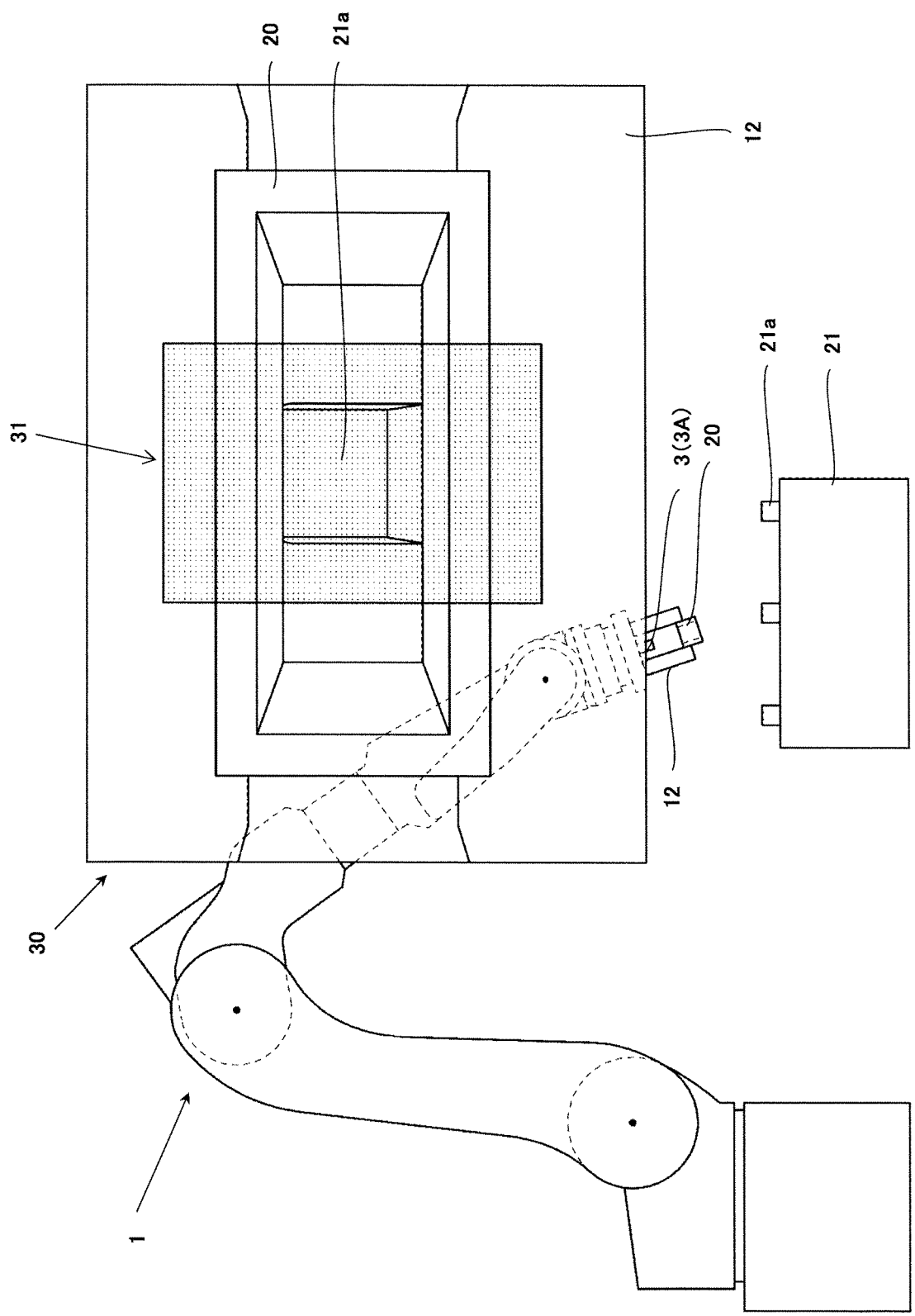
FIG. 24 is a schematic view illustrating a field of view of the operator viewing through a transparent type display unit in a robot system of Modification 1 of Embodiment 7.

FIG. 24 is a schematic view illustrating a field of view of the operator viewing through the transparent type display unit in the robot system of Modification 1 of Embodiment 7.

As illustrated in FIG. 24, in the robot system 100 of Modification 1, the control device 4 controls the transparent type display unit 6 to display the first operating area 31 on the image screen 30 which projects the image information imaged by the camera 3A.

Note that the control device 4 may display the first operating area 31 on the image screen 30, and may display the first operating area 31 as augmented reality, similar to Embodiment 7 described above.

Even in the robot system 100 of Modification 1 thus configured, similar operation and effects to the robot system 100 according to Embodiment 7 can be obtained.

It is apparent for a person skilled in the art that many improvements or other embodiments of the present disclosure are possible from the above description. Therefore, the above description is to be interpreted only as illustration, and it is provided in order to teach a person skilled in the art the best mode that implement the present disclosure. The details of the structures and/or the functions may be changed substantially, without departing from the spirit of the present disclosure.

INDUSTRIAL APPLICABILITY

According to the robot system and the method of operating the same of the present disclosure, since the operator's burden can be reduced and the work efficiency can be improved, it is useful in the field of robots.

DESCRIPTION OF REFERENCE CHARACTERS

1 Robot
2 User Interface
3 Sensor
3A Camera
3B Vibration Sensor
3C Force Sensor
3D Acceleration Sensor
3E Gyrosensor
3F Displacement Sensor
4 Control Device
5 Storage Device
6 Transparent Type Display Unit
6a Display Part
6b Camera
7 Output Device
11a First Link
11b Second Link
11c Third Link
11d Fourth Link
11e Fifth Link
11f Sixth Link
12 End Effector
15 Pedestal
20 Workpiece
20A Workpiece
21 Pedestal
21a Protrusion
30 Image Screen
31 First Operating Area
40 Receiver
41 Motion Controller
42 Output Controller
43 Corrector
51 Task Program
52 Operation Sequence Information
100 Robot System
JT1 First Joint
JT2 Second Joint
JT3 Third Joint
JT4 Fourth Joint
JT5 Fifth Joint
JT6 Sixth Joint

What is claimed is:

1. A robot system comprising:
a user interface configured to receive an operational instruction from an operator;
a robot installed in a workspace, the robot being configured to perform a series of works including a plurality of processes;
a sensor installed in the workspace;
a transparent type display configured so that the operator is visible of a physical real world and configured to display an image screen;
an output device; and
a control device displaying on the transparent type display first information that is information detected by the sensor, as the image screen, when the robot is operated by the user interface, wherein:
after a given first process is finished, for a second process that is the next process of the first process, the control device outputs to the output device an inquiry of which operating mode the robot is to be operated, among three operating modes including an automatic operating mode, a manual operating mode, and a hybrid operating mode, and
when the manual operating mode or the hybrid operating mode is selected, the control device displays detection information detected by the sensor on the transparent type display, as the image screen.

2. The robot system of claim 1, wherein the sensor detects at least one information among an information group comprised of vibration information, audio information, pressure information, acceleration information, inclination information, positional information, and image information.

3. The robot system of claim 1, wherein the sensor is disposed at a tip-end part of the robot.

4. The robot system of claim 1, wherein:
the sensor is comprised of a camera, and
when the robot is operated by the user interface, the control device displays image information imaged by the camera on the transparent type display, as the image screen.

5. The robot system of claim 1, wherein the transparent type display is wearable by the operator.

6. A method of operating a robot system, the robot system including:
a user interface configured to receive an operational instruction from an operator;
a robot installed in a workspace, the robot being configured to perform a series of works including a plurality of processes;
a sensor installed in the workspace;
an output device; and
a transparent type display configured so that the operator is visible of a physical real world and configured to display an image screen, and
the method comprising:
(A) displaying on the transparent type display first information that is information detected by the sensor, as the image screen, when the robot is operated by the user interface; and
(B) after a given first process is finished, for a second process that is the next process of the first process, outputting from the control device an inquiry of which operating mode the robot is to be operated, among three operating modes including an automatic operating mode, a manual operating mode, and a hybrid operating mode,
wherein the displaying of the first information in (A) is performed when the manual operating mode or the hybrid operating mode is selected.

7. The method of claim 6, wherein the sensor detects at least one information among an information group comprised of vibration information, audio information, pressure information, acceleration information, inclination information, positional information, and image information.

8. The method of claim 6, wherein the sensor is disposed at a tip-end part of the robot.

9. The method of claim 6, wherein:
the robot system further includes a memory configured to store a first given threshold set beforehand, and
the method further comprises (C) displaying on the transparent type display abnormality information that is information indicating that an abnormality occurs, when first information detected by the sensor is the first threshold or above.

10. The method of claim 6, wherein:
the sensor is comprised of a camera, and
the displaying of the first information (A) includes displaying image information imaged by the camera on the transparent type display, as the image screen, when the robot is operated by the user interface.

11. The method of claim 10, wherein the displaying of the first information (A) includes displaying the image information imaged by the camera on the transparent type display, while increasing a size of the image screen as an operating speed of the robot becomes slower.

12. The method of claim 10, wherein the displaying of the first information (A) includes displaying the image information imaged by the camera on the transparent type display, while reducing a transparency of the image screen as an operating speed of the robot becomes slower.

13. The method of claim 10, wherein the displaying of the first information (A) includes displaying on the transparent type display the image information imaged by the camera on the image screen as a color image when an operating speed of the robot is a given first speed set beforehand or below, and displaying, on the transparent type display, the image information imaged by the camera on the image screen as a monochrome image when the operating speed of the robot is above the first speed.

14. The method of claim 6, wherein the transparent type display is wearable by the operator.

15. The method of claim 6, wherein:
the robot system further includes a memory configured to store a first operating area set beforehand that is an area where the robot is operable in a given process,
the method further comprises (D) displaying the first operating area on the transparent type display when the robot is operated by the user interface.

16. A robot system comprising:
a user interface configured to receive an operational instruction from an operator;
a robot installed in a workspace, the robot being configured to perform a series of works including a plurality of processes;
a sensor installed in the workspace;
a transparent type display configured so that the operator is visible of a physical real world and configured to display an image screen;
a memory configured to store a first given threshold set beforehand; and
a control device displaying on the transparent type display first information that is information detected by the sensor, as the image screen, when the robot is operated by the user interface,
wherein, when first information detected by the sensor is the first threshold or above, the control device displays on the transparent type display abnormality information that is information indicating that an abnormality occurs.

17. A robot system comprising:
a user interface configured to receive an operational instruction from an operator;
a robot installed in a workspace, the robot being configured to perform a series of works including a plurality of processes;
a sensor installed in the workspace, the sensor being comprised of a camera;
a transparent type display configured so that the operator is visible of a physical real world and configured to display an image screen; and
a control device displaying image information imaged by the camera on the transparent type display, as the image screen, when the robot is operated by the user interface,
wherein the control device displays the image information imaged by the camera on the transparent type display, while increasing a size of an image representing the image information as an operating speed of the robot becomes slower.

18. A robot system comprising:
a user interface configured to receive an operational instruction from an operator;
a robot installed in a workspace, the robot being configured to perform a series of works including a plurality of processes;

a sensor installed in the workspace, the sensor being comprised of a camera;

a transparent type display configured so that the operator is visible of a physical real world and configured to display an image screen; and a control device displaying image information imaged by the camera on the transparent type display, as the image screen, when the robot is operated by the user interface, wherein the control device displays the image information imaged by the camera on the transparent type display, while reducing a transparency of an image representing the image information as an operating speed of the robot becomes slower.

19. A robot system comprising:

a user interface configured to receive an operational instruction from an operator;

a robot installed in a workspace, the robot being configured to perform a series of works including a plurality of processes;

a sensor installed in the workspace, the sensor being comprised of a camera;

a transparent type display configured so that the operator is visible of a physical real world and configured to display an image screen; and a control device displaying image information imaged by the camera on the transparent type display, as the image screen, when the robot is operated by the user interface, wherein, when an operating speed of the robot is a given first speed set beforehand or below, the control device displays, on the transparent type display, an image representing the image information imaged by the camera as a color image, and when the operating speed of the robot is above the first speed, the control device displays, on the transparent type display, an image representing the image information imaged by the camera as a monochrome image.

20. A robot system comprising:

a user interface configured to receive an operational instruction from an operator;

a robot installed in a workspace, the robot being configured to perform a series of works including a plurality of processes;

a sensor installed in the workspace;

a transparent type display configured so that the operator is visible of a physical real world and configured to display an image screen;

a memory configured to store a first operating area set beforehand that is an area where the robot is operable in a given process; and a control device displaying on the transparent type display first information that is information detected by the sensor, as the image screen, when the robot is operated by the user interface, wherein, when the robot is operated by the user interface, the control device displays an image representing the first operating area on the transparent type display.

21. A robot system comprising:

a user interface configured to receive an operational instruction from an operator;

a robot installed in a workspace, the robot being configured to perform a series of works including a plurality of processes;

a sensor installed in the workspace;

a transparent type display configured so that the operator is visible of a physical real world and configured to display an image screen; and a control device displaying on the transparent type display first information that is information detected by the sensor, as the image screen, when the robot is operated by the user interface, wherein, when an operating speed of the robot is a given second speed set beforehand or below, the control device displays the image screen representing the first information on the transparent type display, and when the operating speed of the robot is above the second speed, the control device does not display the image screen representing the first information on the transparent type display.

* * * * *